United States Patent
Hayakawa et al.

(10) Patent No.: US 9,665,781 B2
(45) Date of Patent: May 30, 2017

(54) MOVING BODY DETECTION DEVICE AND MOVING BODY DETECTION METHOD

(75) Inventors: Yasuhisa Hayakawa, Yokohama (JP); Chikao Tsuchiya, Cambridge, MA (US); Masanori Furuya, Beijing (CN); Osamu Fukata, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 557 days.

(21) Appl. No.: 14/235,945

(22) PCT Filed: Jul. 27, 2012

(86) PCT No.: PCT/JP2012/069092
§ 371 (c)(1),
(2), (4) Date: Jan. 29, 2014

(87) PCT Pub. No.: WO2013/018672
PCT Pub. Date: Feb. 7, 2013

(65) Prior Publication Data
US 2014/0146176 A1    May 29, 2014

(30) Foreign Application Priority Data
Aug. 2, 2011    (JP) ................................. 2011-168899

(51) Int. Cl.
*G06T 7/20*    (2017.01)
*G06K 9/00*    (2006.01)
(Continued)

(52) U.S. Cl.
CPC ..... *G06K 9/00805* (2013.01); *G06K 9/00201* (2013.01); *G06K 9/00798* (2013.01);
(Continued)

(58) Field of Classification Search
CPC .......... G06K 9/00791; G06K 9/00805; G06K 9/00362
See application file for complete search history.

(56) References Cited

U.S. PATENT DOCUMENTS

| | | |
|---|---|---|
| 7,190,282 B2 | 3/2007 | Maemura et al. |
| 2005/0147277 A1* | 7/2005 | Higaki ............... G06K 9/00362 382/103 |

(Continued)

FOREIGN PATENT DOCUMENTS

| | | |
|---|---|---|
| CN | 1673679 A | 9/2005 |
| EP | 1964719 A2 | 9/2008 |

(Continued)

OTHER PUBLICATIONS

An English translation of the Japanese Office Action for the corresponding Japanese patent application No. 2013-526867 issued on Aug. 12, 2014.

*Primary Examiner* — Christopher Findley
(74) *Attorney, Agent, or Firm* — Global IP Counselors. LLP

(57) ABSTRACT

A moving-body-detecting device is provided with an image capture unit, an image conversion unit, a three-dimensional-object-detecting unit, a turn detecting unit, and a control unit. The image capture unit captures images of the rear side of a vehicle. The image conversion unit performs viewpoint conversion of the captured images into bird's-eye view images. The three-dimensional-object-detecting unit generates differential waveform information based on a differential image of bird's-eye view images taken as different points in time, and detects three-dimensional objects based on the differential waveform information. The control unit suppresses detection of the three-dimensional object based on the differential waveform information, in cases in which (Continued)

turning of the vehicle has been detected as compared with cases in which the vehicle is not turning.

20 Claims, 18 Drawing Sheets

(51) Int. Cl.
*G08G 1/16* (2006.01)
*G06T 7/254* (2017.01)

(52) U.S. Cl.
CPC .............. *G06T 7/254* (2017.01); *G08G 1/166* (2013.01); *G06T 2207/10016* (2013.01); *G06T 2207/20224* (2013.01); *G06T 2207/30252* (2013.01)

(56) References Cited

U.S. PATENT DOCUMENTS

2008/0205706 A1* 8/2008 Hongo ..................... B60R 1/00
 382/104
2012/0133769 A1* 5/2012 Nagamine ................. B60R 1/00
 348/148

FOREIGN PATENT DOCUMENTS

| JP | 7-280517 A | 10/1995 |
| JP | 2000-214256 A | 8/2000 |
| JP | 2005-276056 A | 10/2005 |
| JP | 2008-219063 A | 9/2008 |
| JP | 2008-227646 A | 9/2008 |
| JP | 2009-265783 A | 11/2009 |
| JP | 2009-277021 A | 11/2009 |
| JP | WO 2011/016367 A1 * | 2/2011 |

* cited by examiner

MOVING BODY DETECTION DEVICE AND MOVING BODY DETECTION METHOD

CROSS-REFERENCE TO RELATED APPLICATIONS

This application is a U.S. National stage application of International Application No. PCT/JP2012/069092, filed Jul. 27, 2012, which claims priority under to Japanese Patent Application No. 2011-168899 filed in Japan on Aug. 2, 2011.

BACKGROUND

Field of the Invention

The present invention relates to a moving-body-detecting device, and to a moving-body-detecting system.

Background Information

In the past, there have been proposed an obstacle detection device equipped with a camera for imaging the surroundings of a vehicle, and designed to convert images taken by the camera into bird's-eye images, as well to calculate differentials between bird's-eye images taken at different times, and detect three-dimensional objects surrounding the vehicle based on these differentials. With this obstacle detection device, in cases in which a three-dimensional object, such as another vehicle, is present within bird's-eye images, the other vehicle becomes apparent as a differential, whereby the other vehicle or other three-dimensional object may be detected based on this characteristic (see Japanese Laid-Open Patent Application No. 2008-227646).

SUMMARY

However, in cases in which the technique disclosed in Japanese Laid-Open Patent Application No. 2008-227646 is applied to a technique for assessing whether a three-dimensional object is a moving body or a stationary object, stationary objects are sometimes mistakenly assessed as being moving bodies. Specifically, with the obstacle detection device disclosed in Japanese Laid-Open Patent Application No. 2008-227646, in cases in which the vehicle is turning, a stationary object may appear to be moving due to this turning, creating the possibility that a stationary object will be assessed in error as being a moving body.

The present invention is directed to solving this problem of the prior art, and has as an object to provide a moving-body-detecting device and a moving-body-detecting method, whereby it is possible to improve the accuracy of detection of moving bodies.

The moving-body-detecting device of the present invention counts the number of pixels that exhibit a predetermined differential, within differential images of bird's-eye view images taken at different times, to arrive at a frequency distribution, thereby generating differential waveform information; and based on this differential waveform information, detects three-dimensional objects present within a predetermined area, as well as calculating the speed of motion of the three-dimensional objects, from temporal variation of the waveform of the differential waveform information. Then, based on the speed of motion of the three-dimensional objects, it is detected whether the three-dimensional objects are moving bodies. Furthermore, the moving-body-detecting device detects turning of the vehicle, and in cases in which it has been detected that the vehicle is turning, detection of three-dimensional objects based on differential waveform information, and detection of three-dimensional objects as being moving bodies, is inhibited as compared with cases in which the vehicle is not turning.

According to the present invention, in cases in which it is detected that the vehicle is turning, the detection sensitivity to moving bodies is reduced as compared with cases in which the vehicle is not turning. Therefore, even when the vehicle is turning, making stationary objects appear to be moving in the images, mistaken assessment of stationary objects as moving bodies due to reduced accuracy of assessment of moving bodies can be avoided. Consequently, the accuracy of assessment of moving bodies can be improved.

BRIEF DESCRIPTION OF THE DRAWINGS

Referring now to the attached drawings which form a part of this original disclosure.

DETAILED DESCRIPTION OF THE EMBODIMENTS

Figure 1:
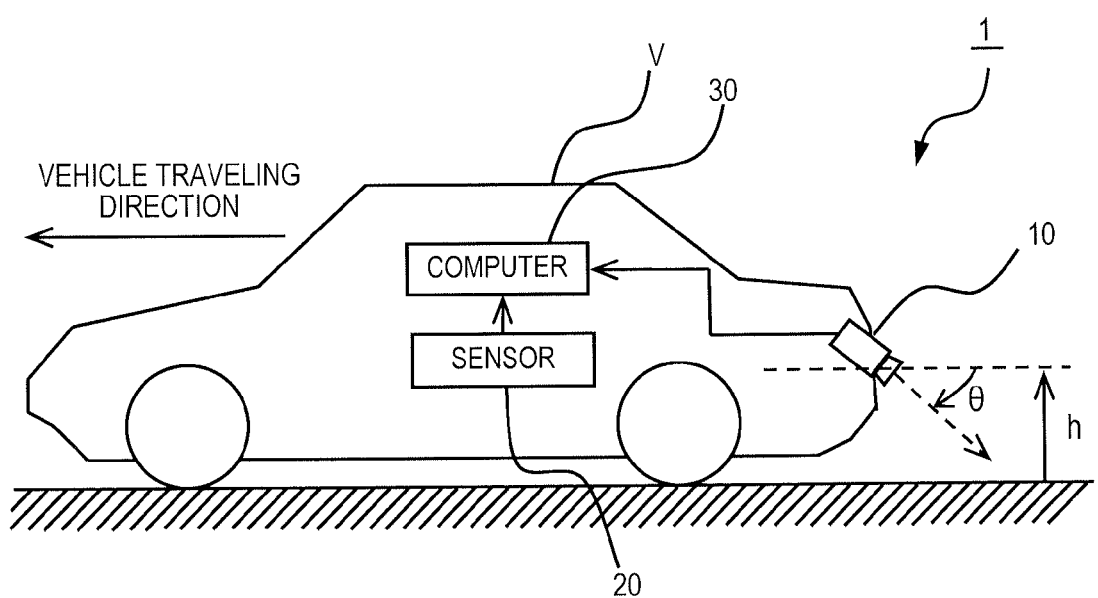
FIG. 1 is a simplified schematic view of the moving-body-detecting device according to the present embodiment, showing an example of a case in which the moving-body-detecting device is installed on a vehicle.

The preferred embodiments of the present invention are described below based on the drawings. FIG. 1 is a simplified schematic view of a moving-body-detecting device 1 according to the present embodiment, showing an example of a case in which the moving-body-detecting device 1 is installed on a vehicle V. The moving-body-detecting device 1 shown in FIG. 1 presents the driver of the vehicle V with information of various kinds, from the results of imaging the surroundings of the vehicle V, and is provided with a camera (imaging means) 10, a sensor 20, and a computer 30.

The camera 10 shown in FIG. 1 is attached at a site at height h at the rear of the vehicle V, so that the optical axis is oriented downward by an angle θ from the horizontal. The camera 10 is designed to image detection areas from that position. The sensor 20 comprises, for example, a vehicle speed sensor for detecting the speed of travel of the vehicle V, and a steering angle sensor for detecting control input to the steering wheel. Based on images taken by the camera 10, the computer 30 detects moving bodies (for example, other vehicles, motorcycles, and the like) present to the rear side of the vehicle V.

The moving-body-detecting device is additionally provided with warning device, not illustrated, for warning the driver of the vehicle V in cases where there is a possibility of a moving body detected by the computer 30 coming into contact with the vehicle V, or the like.

Figure 2:
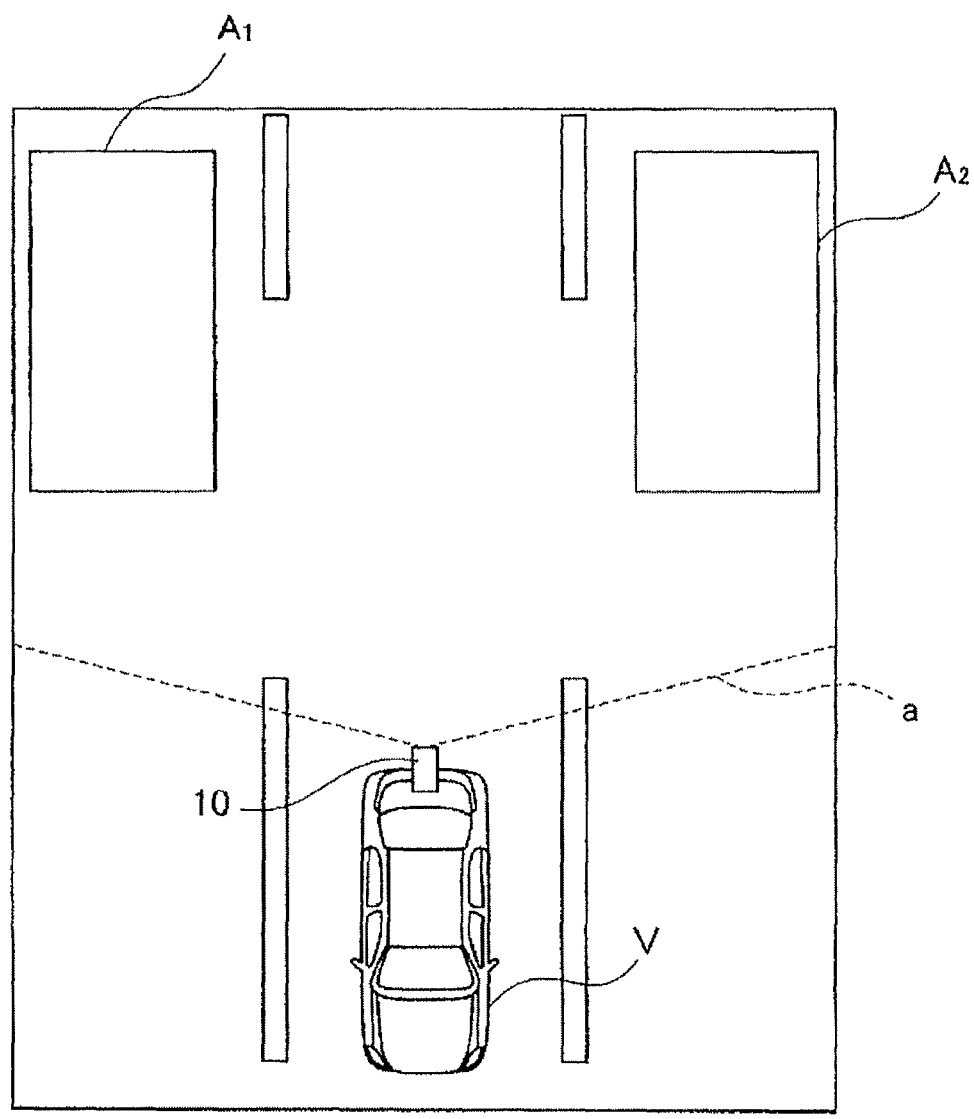
FIG. 2 is a top view showing the vehicle shown in FIG. 1, shown while traveling.

FIG. 2 is a top view showing the vehicle shown in FIG. 1, shown while traveling. As shown in FIG. 2, the camera 10 is capable of imaging the rear side of the vehicle V. Detection areas (predetermined areas) A1, A2 targeted for detection of other vehicles and other such moving bodies are established in the lanes adjacent to the lane of travel being traveled by the vehicle V, and the computer 30 detects whether any moving bodies are present within the detection areas A1, A2. These detection areas A1, A2 are established from relative positions with respect to the vehicle V. The detection areas A1, A2 may be established in the adjacent lanes, by utilizing a lane striping auto-recognition technique or the like.

Figure 3:
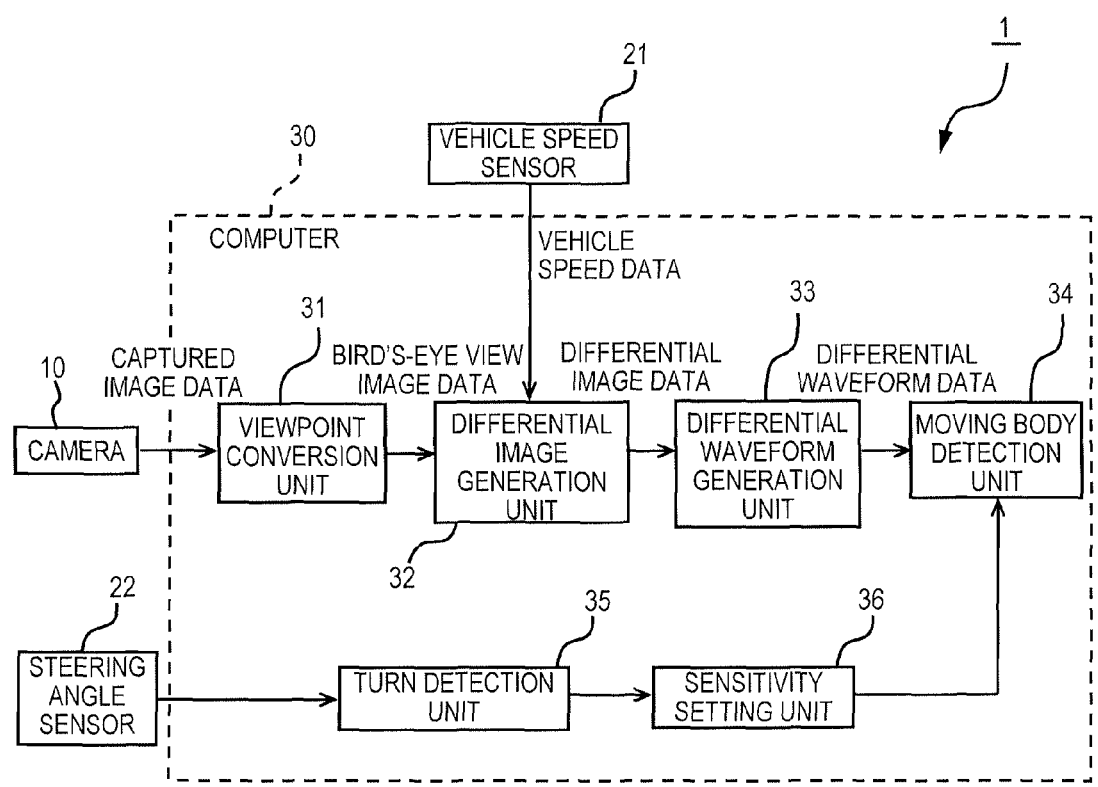
FIG. 3 is a block diagram showing details of the computer shown in FIG. 1.

FIG. 3 is a block diagram showing details of the computer 30 shown in FIG. 1. In FIG. 3, the camera 10 and the sensor 20 are illustrated as well, in order to make clear the connection relationships. As will be understood from FIG. 3, the sensor 20 is constituted by a vehicle speed sensor 21 and a steering angle sensor 22; however, there is no limitation to this, and other sensors may be further provided as well.

As shown in FIG. 3, the computer 30 is provided with a viewpoint conversion unit 31, a differential image generation unit (differential-image-generating means) 32, a differential waveform generation unit (differential-waveform-generating means) 33, and a moving body detection unit (moving-body-detecting means) 34.

The viewpoint conversion unit 31 inputs captured image data obtained through imaging by the camera 10 and including the detection areas A1, A2, and performs viewpoint conversion to bird's-eye image data of the input captured image data as it would be seen in a bird's-eye view state. This bird's-eye view state refers to a state seen from the viewpoint of a hypothetical camera that, for example, is looking vertically downward from up in the air. Such viewpoint conversion is executed in the manner disclosed, for example, in Japanese Laid-Open Patent Application 2008-219063.

Figure 4:
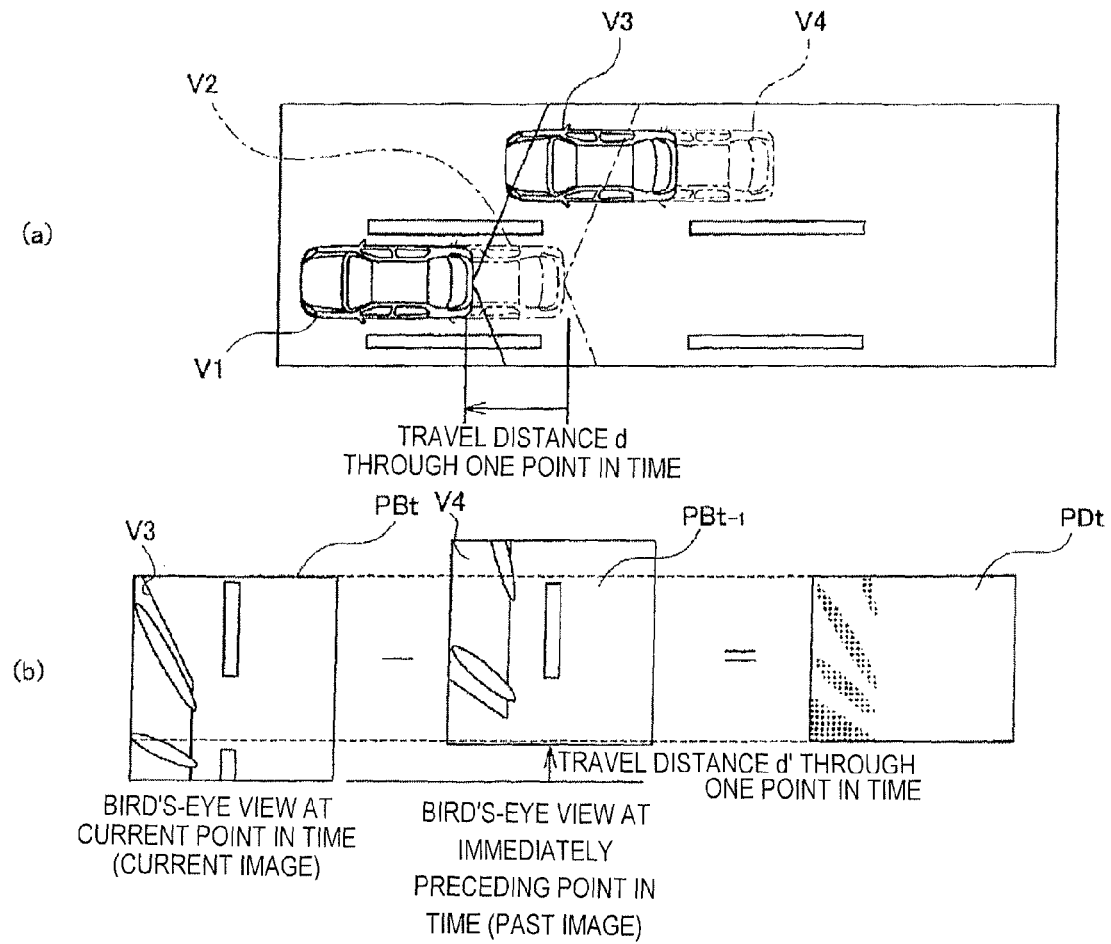
FIG. 4 is a top view showing an overview of processing by the differential image generation unit shown in FIG. 3, wherein part (a) shows vehicles in motion, and part (b) shows an overview of position alignment.

The differential image generation unit 32 sequentially inputs the bird's-eye image data obtained by viewpoint conversion by the viewpoint conversion unit 31, and aligns the positions of input bird's-eye image data taken at different times. FIG. 4 is a top view showing an overview of processing by the differential image generation unit 32 shown in FIG. 3, wherein part (a) shows vehicles V in motion, and part (b) shows an overview of position alignment.

Let it be assumed that, as shown in part (a) of FIG. 4, at the present time the vehicle V is positioned at V1, whereas at the immediately preceding point in time, the vehicle V was positioned at V2. Let it also be assumed that another vehicle V is positioned to the rear direction from the vehicle V and is traveling in parallel to the vehicle V, and that at the present time this other vehicle V is positioned at V3, whereas at the immediately preceding point in time, the other vehicle V was positioned at V4. Let it further be assumed that, since the immediately preceding point in time, the vehicle V has moved by a distance d. "Immediately preceding point in time" may refer to a past point in time preceding the present time by a predetermined duration (for example, a single control cycle), and may be a past point in time of any duration preceding the present.

In this state, the bird's-eye image $PB_t$ at the present point in time is as shown in part (b) of FIG. 4. In this bird's-eye image $PB_t$, the lane striping painted onto the road face appears rectangular in shape, reflecting a state of being viewed from above relatively accurately. However, for the other vehicle V3, foreshortening is observed to occur. Likewise, in the bird's-eye image $PB_{t-1}$ taken at the immediately preceding point in time, the lane striping painted onto the road face appears rectangular in shape, reflecting a state of being viewed from above relatively accurately, but for the other vehicle V4, foreshortening is observed to occur.

The differential image generation unit 32 executes position alignment of the aforedescribed bird's-eye images $PB_t$, $PB_{t-1}$ on the data. At this time, the differential image generation unit 32 offsets the bird's-eye image $PB_{t-1}$ taken at the immediately preceding point in time, matching it in position to the bird's-eye image $PB_t$ at the current point. The amount of offset d' is an amount equivalent to the travel distance d shown in part (a) of FIG. 4, and is determined based on a signal from the speed sensor 20, and the duration from the immediately preceding point in time to the present point in time.

In the present embodiment, the differential image generation unit 32 performs position alignment, in bird's-eye view, of the positions of bird's-eye images taken at different times, obtaining a bird's-eye image in which the positions thereof are aligned. This "position alignment" process can be performed at an accuracy level according to the class of object being detected, and to the required detection accuracy. For example, the process may be an exacting position alignment process involving alignment of position on the basis a given point in time and a given position; or a looser position alignment process simply involving ascertaining the coordinates of the bird's-eye view images.

Following position alignment, the differential image generation unit 32 calculates a differential to be associated with each pixel of the bird's-eye images $PB_t$, $PB_{t-1}$, and extracts those pixels for which the absolute value of the aforementioned differential is equal to or greater than a predetermined value, designating these as differential pixels. The differential image generation unit 32 then generates a differential image $PD_t$ from these differential pixels.

Reference is made again to FIG. 3. The differential waveform generation unit 33 generates a differential waveform based on the differential image $PD_t$ data generated by the differential image generation unit 32.

Figure 5:
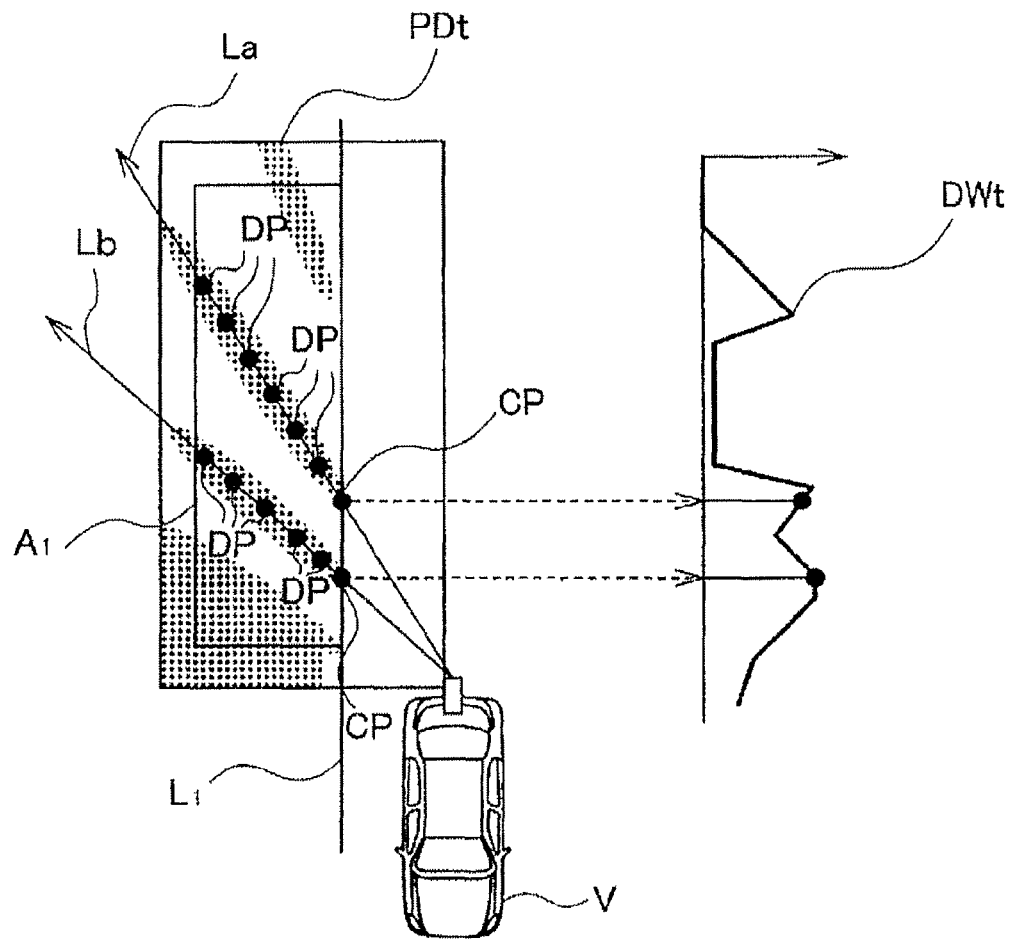
FIG. 5 is a simplified diagram showing generation of a differential waveform by the differential waveform generation unit shown in FIG. 3.

FIG. 5 is a simplified diagram showing generation of a differential waveform by the differential waveform generation unit 33 shown in FIG. 3. As shown in FIG. 5, from sections corresponding to the detection areas A1, A2 from within the differential image $PD_t$, the differential waveform generation unit 33 generates a differential waveform $DW_t$. At this time, the differential waveform generation unit 33 generates the differential waveform $DW_t$ along the direction of foreshortening of three-dimensional objects due to viewpoint conversion. In the example of FIG. 5, for convenience, the description employs only the detection area A1.

To describe in more specific terms, firstly, the differential waveform generation unit 33 defines a line La lying the direction of foreshortening of three-dimensional objects in the differential waveform $DW_t$ data. The differential waveform generation unit 33 then counts the number of differential pixels DP showing a predetermined differential, and which lie on the line La. Here, in cases in which the pixel values of the differential waveform $DW_t$ are absolute values of pixel value differences between the bird's-eye images $PB_t$, $PB_{t-1}$, the differential pixels DP are pixels that exceed a predetermined value; or in cases in which the pixel values of the differential waveform $DW_t$ are represented by "0's" and "1's," are pixels having the value "1."

After counting the number of differential pixels DP, the differential waveform generation unit 33 derives a crossing point CP of the line La and a line L1. Then the differential waveform generation unit 33, associating the crossing point CP and the count number, determines a horizontal axis position (a position on the vertical direction axis in the plane of the page in FIG. 5) based on the position of the point CP, and determines a vertical axis position (a position on the sideways direction axis in the plane of the page in FIG. 5) from the count number.

Subsequently, in like manner, the differential waveform generation unit 33 defines a line lying in the direction of foreshortening of three-dimensional objects, counts the number of differential pixels DP, determines a horizontal axis position based on the position of the crossing point CP, and determines a vertical axis position from the count number (the number of differential pixels DP). The differential waveform generation unit 33 successively repeats the aforedescribed process to arrive at a frequency distribution, and generates a differential waveform $DW_t$.

As shown in FIG. 5, the lines La and Lb lying in the direction of foreshortening of three-dimensional objects differ in terms of the distance over which they overlap the detection area A1. Therefore, if the detection area A1 is held to be filled with differential pixels DP, the number of differential pixels DP on line La must be greater than that on line Lb. Therefore, in cases of determination of a vertical axis position from the differential pixel DP count number, the differential waveform generation unit 33 performs normalization based on the distance of overlap of the detection area A1 and the lines La and Lb in the direction of foreshortening of three-dimensional objects. To cite a specific example, in FIG. 5, there are six differential pixels DP lying on line La, and five differential pixels DP lying on line Lb. Therefore, when determining a vertical axis position from the count number in FIG. 5, the differential waveform generation unit 33 performs normalization by dividing the count number by the overlap distance, or other such method. In so doing, as shown by the differential waveform $DW_t$, the values of the differential waveform $DW_t$ corresponding to the lines La and Lb in the direction of foreshortening of three-dimensional objects assume substantially equal values.

The moving body detection unit 34 detects moving bodies, based on differential waveform $DW_t$ data like that shown in FIG. 5. During detection of a moving body, this moving body detection unit 34 first executes a threshold value process. In specific terms, the moving body detection unit 34 compares the average value of the differential waveform $DW_t$ to a predetermined threshold value, and if the average value is equal to or greater than the threshold value, decides that the object is possibly a moving body. On the other hand, if the average value is not equal to or greater than the threshold value, the moving body detection unit 34 decides there is no possibility that the object is a moving body. Here, in cases in which a differential waveform $DW_t$ is due to noise, the average value is unlikely to be equal to or greater than the threshold value. Therefore, the moving body detection unit 34 first executes the threshold value process and decides regarding the possibility of a moving body. However, the moving body detection unit 34 is not limited to doing so, and may instead, for example, decide that an object is possibly a moving body in cases in which the ratio of the surface area equal to or greater than a predetermined threshold value within the differential waveform $DW_t$ is equal to or greater than a predetermined ratio, or, if this is not the case, decides there is no possibility of the object being a moving body.

Once the moving body detection unit 34 decides that a three-dimensional object indicated by a differential waveform $DW_t$ is possibly a moving object, the differential waveform $DW_{t-1}$ of the immediately preceding point in time and this differential waveform $DW_t$ are associated, and an estimated speed of the moving object is calculated thereby. For example, in a case in which the three-dimensional object is another vehicle V, differential pixels DP are easily obtained in the tire sections of the other vehicle V, and therefore the differential waveform $DW_t$ will easily tend to have two maximum values. Therefore, by deriving the deviation between the maximum values of the immediately preceding point in time differential waveform $DW_{t-1}$ and this differential waveform $DW_t$, the relative speed of the other vehicle V with respect to the vehicle V can be derived. In so doing, the moving body detection unit 34 derives an estimated speed of the three-dimensional object. Then, based on the estimated speed, the moving body detection unit 34 decides whether the three-dimensional object represented by the differential waveform $DW_t$ is a moving object or a stationary object.

The computer 30 is further provided with a turn detection unit (turn-detecting means) 35 and a sensitivity setting unit (sensitivity setting means) 36. The turn detection unit 35 detects turning of the vehicle V, detecting turning of the vehicle from the steering angle detected by the steering angle sensor 22. The sensitivity setting unit 36 varies the detection sensitivity to moving objects by the moving body detection unit 34. Rather than relying on the steering angle, the turn detection unit 35 may instead make the decision as to whether a curve is currently being traveled, based on navigation or the like.

Figure 6:
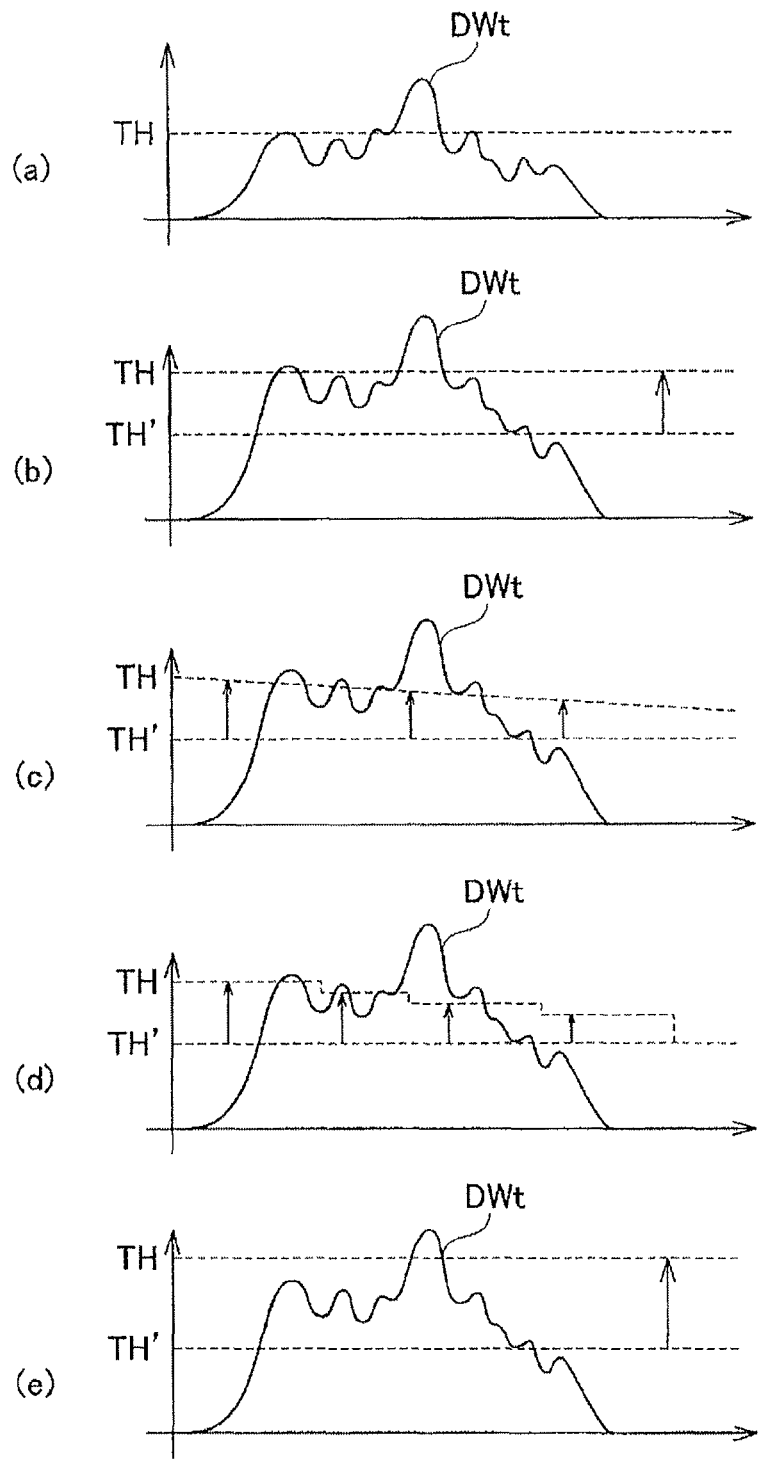
FIG. 6 is a diagram showing examples of differential waveforms generated by the differential waveform generation unit shown in FIG. 3, wherein part (a) shows an example of a differential waveform obtained during straight advance of a vehicle, and parts (b) to (e) show examples of differential waveforms obtained during turning of a vehicle, with part (c) showing a first example of reduced detection sensitivity to moving bodies, part (d) showing a second example of reduced detection sensitivity to moving bodies, and part (e) showing a third example of reduced detection sensitivity to moving bodies.

FIG. 6 is diagram showing examples of differential waveforms $DW_t$ generated by the differential waveform generation unit 33 shown in FIG. 3, wherein part (a) shows an example of a differential waveform $DW_t$ obtained during straight advance of a vehicle, and parts (b) to (e) show examples of differential waveforms DW obtained during turning of a vehicle, with part (c) showing a first example of reduced detection sensitivity to moving bodies, part (d) showing a second example of reduced detection sensitivity to moving bodies, and part (e) showing a third example of reduced detection sensitivity to moving bodies.

Firstly, let it be assumed that a differential waveform $DW_t$ like that shown in part (a) of FIG. 6 has been obtained. At this time, the moving body detection unit 34 executes a threshold process like that described previously. In the example shown in part (a) of FIG. 6, the average value of the differential waveform $DW_t$ is not equal to or greater than a threshold value TH. Therefore, the moving body detection unit 34 decides that the differential waveform $DW_t$ is not that of a moving body, and is due, for example, to noise (specifically, to stationary objects of complex texture, such as grass, walls, and the like).

However, when the vehicle V turns, the differential waveform $DW_t$ tends to become larger in size, as shown in part (b) of FIG. 6. The reason is that, as a result of turning, stationary objects appear in images as if they were moving, making it easy for differentials to be obtained. In particular, in the example shown in part (b) of FIG. 6, the average value of the differential waveform $DW_t$ is equal to or greater than the threshold value TH. Therefore, stationary objects are easily misidentified as moving objects.

Accordingly, the sensitivity setting unit 36 reduces the sensitivity of detection of moving objects during turning. In specific terms, the sensitivity setting unit 36 raises the predetermined threshold value TH in the manner shown in part (b) of FIG. 6 (the threshold value prior to the variation is shown by TH'). In so doing, the average value of the differential waveform $DW_t$ is no longer equal to or greater than the threshold value TH, making it unlikely that the moving body detection unit 34 will misidentify a stationary object as a moving object.

Moreover, it is preferable for the sensitivity setting unit 36 to raise the threshold value TH in the manner shown in part (c) of FIG. 6 or part (d) of FIG. 6. Specifically, the sensitivity setting unit 36 raises the threshold value TH corresponding to the rear side of the vehicle V, doing so to a greater extent than the threshold value TH corresponding to the front side of the vehicle V. The moving-body-detecting device 1 according to the present embodiment is designed to detect moving objects to the rear side of the vehicle V, and therefore when turning, differentials in captured images tend to be larger towards the rear side than towards the front side of vehicle. Accordingly, by raising the threshold value TH corresponding to the rear side of the vehicle V in the manner described above, the threshold value TH can be set appropriately, and the accuracy of detection of moving objects can be improved even further.

In such cases, the moving body detection unit 34 may set a linear threshold value TH as shown in part (c) of FIG. 6, or set a stepped threshold value TH as shown in part (d) of FIG. 6.

Additionally, the sensitivity setting unit 36 detects turning by detecting the steering angle detected by the steering angle sensor 22, and at greater steering angles, lowers the sensitivity of detection of moving objects by the moving body detection unit 34. The reason is that sharper turning produces greater apparent movement of stationary objects in images, making it even easier for a differential to be obtained. In specific terms, at greater steering angles, the sensitivity setting unit 36 raises the predetermined threshold value TH as shown in part (e) of FIG. 6. Specifically, when the example shown in part (e) of FIG. 6 and the example shown in part (b) of FIG. 6 are compared, the threshold value TH shown in part (e) of FIG. 6 is seen to be higher. By raising the threshold value TH at greater steering angles, the sensitivity setting unit 36 may set threshold values in an even more appropriate manner.

The sensitivity setting unit 36 may reduce the sensitivity in consideration of lateral G force, accelerator position, and brake operation, taken in addition to the steering angle. For example, when movement in the longitudinal direction due to brake operation or variation of accelerator position occurs, the differential waveform $DW_t$ tends to more easily become larger. Likewise, with variations of lateral G force, the differential waveform $DW_t$ tends to more easily become larger.

Figure 7:
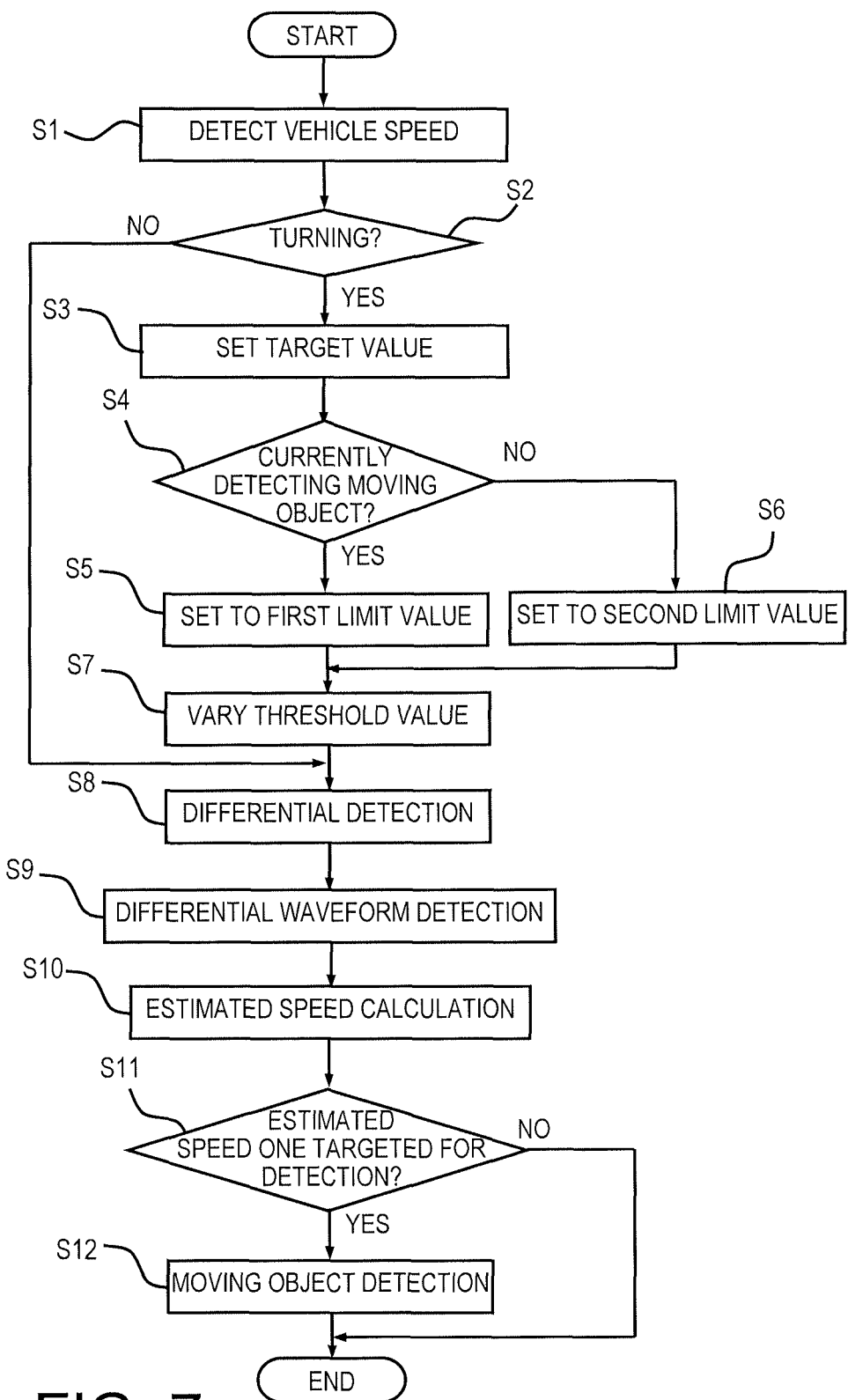
FIG. 7 is a flowchart showing the moving-body-detecting method according to the present embodiment.

Next, the moving-body-detecting method according to the present embodiment shall be described. FIG. 7 is a flowchart showing the moving-body-detecting method according to the present embodiment. As shown in FIG. 7, firstly, the computer 30 detects vehicle speed, based on a signal from the vehicle speed sensor 20 (S1).

Next, based on a signal from the vehicle speed sensor 22, the turn detection unit 35 decides whether or not the vehicle V is turning (S2). In the case of a decision that the vehicle V is not turning (S2: NO), the process advances to Step S8.

On the other hand, in the case of a decision that the vehicle V is turning (S2: YES), the sensitivity setting unit 36, acting based on the magnitude of the steering angle, sets a target value of the threshold value TH (S3). Next, the moving body detection unit 34 decides whether any moving body is currently detected (S4).

In the case of a decision that a moving body is currently detected (S4: YES), the sensitivity setting unit 36 sets a first limit value (a limit value serving as an upper limit) as to the amount of variation when varying the sensitivity (S5). The process then advances to Step S7. On the other hand, in the case of a decision that no moving body is currently detected (S4: NO), a region setting unit 33b sets the limit value to a second limit value (S6). The process then advances to Step S7. Here, the first limit value is smaller than the second limit value. Therefore, a situation in which the threshold value varies suddenly during detection of moving objects, so that moving bodies can no longer be detected, can be prevented.

Next, the sensitivity setting unit 36 varies the threshold value TH (S7). Specifically, the sensitivity setting unit 36 varies the threshold value TH within a range not to exceed the limit value that was set in Step S5 or S6, to bring the value into approximation with the target value that was derived in Step S3.

Thereafter, the differential image generation unit 32 detects differentials (S8). At this time, the differential image generation unit 32 generates differential image data $PD_t$ in the manner that was described with reference to FIG. 4.

Next, based on the differential image data $PD_t$ generated in Step S8, the differential waveform generation unit 33 generates a differential waveform $DW_t$ in the manner described previously with reference to FIG. 5 (S9). The moving body detection unit 34 then associates the differential waveform $DW_{t-1}$ of the immediately preceding point in time and this differential waveform $DW_t$, and calculates thereby an estimated speed of a three-dimensional object (S10).

Thereafter, the moving body detection unit 34 decides whether the estimated speed that was calculated in Step 10 is one that is targeted for detection (S11). The moving-body-detecting device 1 of the present embodiment is designed to detect other vehicles, motorcycles, and the like, with which there is a possibility of contact during a lane change. Therefore, the moving body detection unit 34 decides whether the estimated speed in Step S11 is an appropriate speed for another vehicle, motorcycle, or the like.

In the case of a decision that the estimated speed is an appropriate one for another vehicle, motorcycle, or the like (S11: YES), the moving body detection unit 34 decides that the three-dimensional object represented by the differential waveform $DW_t$ is a moving body targeted for detection (i.e., another vehicle, motorcycle, or the like) (S12). The process shown in FIG. 7 then terminates. On the other hand, in the case of a decision that the estimated speed is not one appropriate for another vehicle, motorcycle, or the like (S11: NO), the moving body detection unit 33 decides that the three-dimensional object represented by the differential waveform $DW_t$ is not a moving body targeted for detection, and the process shown in FIG. 7 terminates.

In the above manner, with the moving-body-detecting device 1 and the moving-body-detecting method according to the present embodiment, in cases in which turning of the vehicle V has been detected, the sensitivity of detection of moving objects is lowered as compared with cases in which the vehicle V is not turning. Therefore, despite that fact that stationary objects in images appear to be moving as the vehicle V turns, because the decision sensitivity with regard to moving bodies has been lowered, stationary objects are not mistakenly assessed as moving objects. Consequently, the accuracy of detection of moving objects can be improved.

Moreover, in cases in which turning of the vehicle V has been detected, the predetermined threshold value TH is raised in comparison with cases in which the vehicle V is not turning, thereby lowering the sensitivity of detection of moving objects. Therefore, despite that fact that stationary objects in images appear to be moving as the vehicle V turns, and that the differential waveforms appear large despite being associated with stationary objects, due to the raised threshold value TH, such objects are unlikely to be decided to be moving objects.

Moreover, because the threshold value TH corresponding to the rear side of the vehicle is set to a value higher than the threshold value TH corresponding to the front side of the vehicle, under conditions (such as those encountered when turning) in which the differential waveform $DW_t$ towards the rear side of the vehicle tends to appear larger than that to the front side of the vehicle, an appropriate threshold value TH will be set, and the accuracy of detection of moving objects can be improved even further.

Moreover, because the sensitivity of detection to moving objects is lowered at larger steering angles, even under conditions in which the steering angle is larger and stationary objects tend to appear to move to an even greater extent within images, the decision sensitivity with regard to moving bodies has been lowered, and therefore mistaken assessment of stationary objects as moving objects can be further avoided.

Moreover, because the amount of decrease in sensitivity is smaller during detection of a moving body than that during non-detection of a moving body, it is possible to reduce the frequency of appreciable reductions of sensitivity during detection of a moving body, which can give rise to leaks in detection of moving bodies.

Next, a second embodiment of the present invention will be described. The moving-body-detecting device and moving-body-detecting method according to the second embodiment are similar to those of the first embodiment, but with some differences in configuration and in process content. The differences with respect to the first embodiment are described below.

Figure 8:
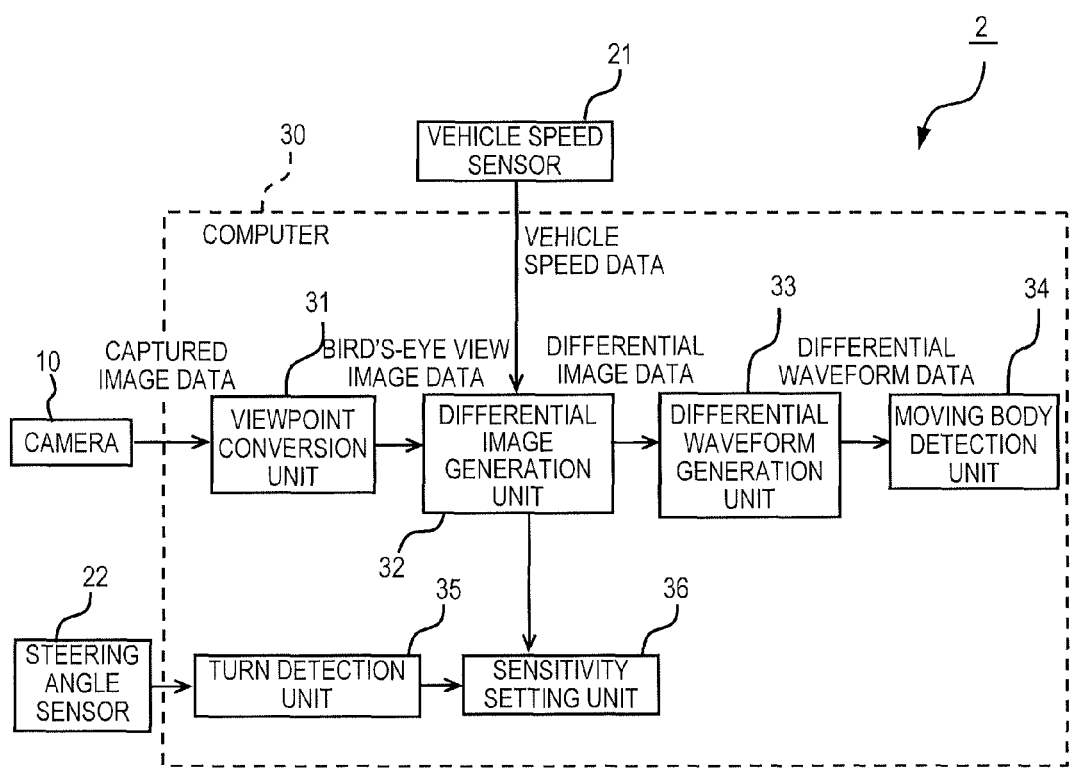
FIG. 8 is a block diagram showing details of the computer according to a second embodiment.

FIG. 8 is a block diagram showing details of the computer 30 according to the second embodiment. In FIG. 8, the camera 10 and the sensor 20 are illustrated as well, in order to make clear the connection relationships.

As shown in FIG. 8, the computer 30 according to the second embodiment is designed to control the differential image generation unit 32, to lower the detection sensitivity to moving objects by the moving body detection unit 34. As described previously, the differential image generation unit 32 executes, on the data, position alignment of bird's-eye images $PB_t$, $PB_{t-1}$ taken at different points in time, calculates differentials, and extracts those pixels for which the absolute value of the aforementioned differential is equal to or greater than a predetermined value, as differential pixels DP. In the second embodiment, the sensitivity setting unit 36 makes extraction of differential pixels DP more difficult, for example, by increasing the aforementioned value, so as to control the differential waveform $DW_t$ to smaller size, without changing the threshold value TH. To describe in specific terms, whereas normally the differential image generation unit 32 extracts differential pixels DP at a luminance difference of "5," in certain states of turning, this is changed such that differential pixels DP are extracted at luminance difference of, for example, "20". In so doing, the result is that the detection sensitivity to moving objects by the moving body detection unit 34 is lower. There is no limitation to the aforedescribed arrangement, and the differential waveform generation unit 33, after generating the differential waveform, may then simply compress the differential waveform $DW_t$ in the height direction, so as to control the differential waveform $DW_t$ to smaller size.

Next, the moving-body-detecting method according to the second embodiment shall be described. The moving-body-detecting method according to the second embodiment is similar to that of the first embodiment, except that in Step S3, rather than setting a target value of the threshold value TH, a target value of a predetermined value for extraction of the differential pixels DP is set. Additionally, in Step S7, the predetermined value is varied, rather than varying the threshold value TH. Other processes are identical to those of the first embodiment.

In this way, with the moving-body-detecting device 2 and the moving-body-detecting method according to the second embodiment, the detection accuracy of moving objects can be improved a similar manner to the first embodiment.

Furthermore, according to the second embodiment, the detection sensitivity to moving objects is reduced by adopting a larger predetermined value for detection of differential pixels DP in cases in which turning of the vehicle V is detected as compared with cases in which the vehicle V is not turning. Therefore, the differential pixels DP themselves rare more difficult to detect, and the differential waveform $DW_t$ appears smaller, so that mistaken assessment as moving bodies can be avoided.

Next, a third embodiment of the present invention will be described. The moving-body-detecting device and moving-body-detecting method according to the third embodiment are similar to those of the first embodiment, but with some differences in configuration and in process content. The differences with respect to the first embodiment are described below.

Figure 9:
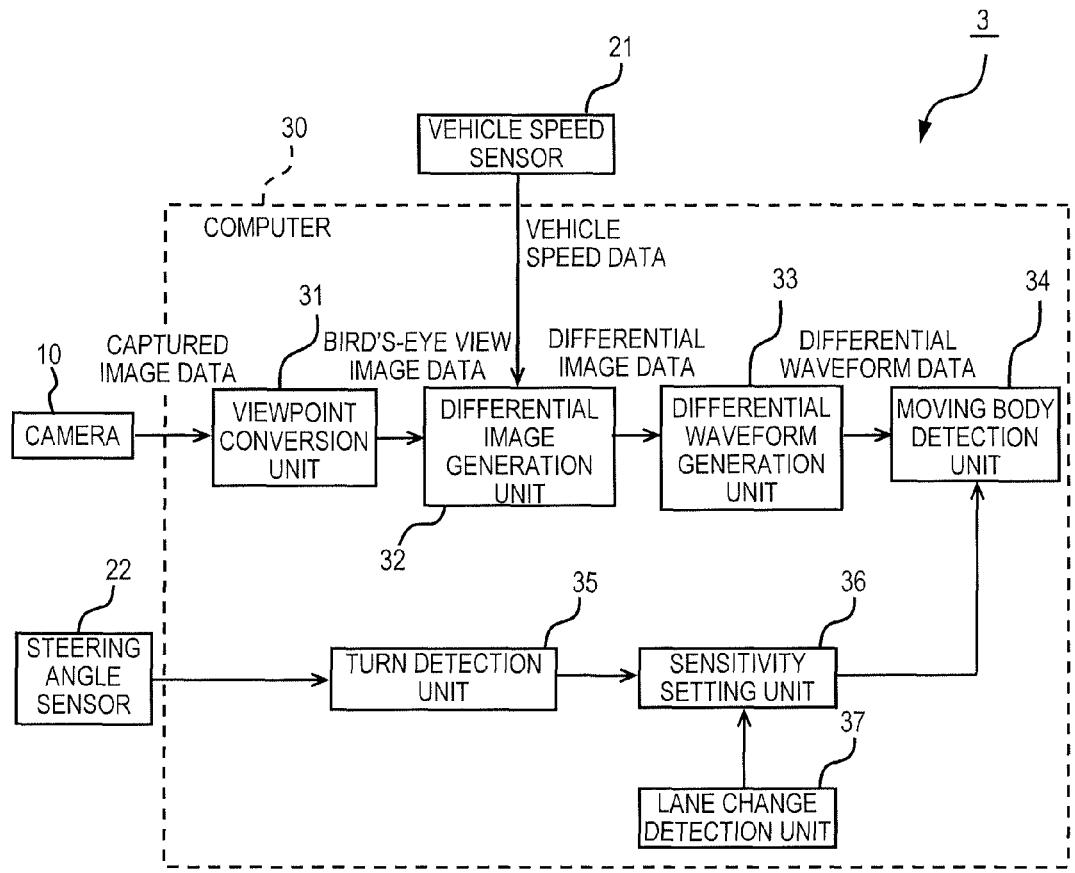
FIG. 9 is a block diagram showing details of the computer according to a third embodiment.

FIG. 9 is a block diagram showing details of the computer 30 according to the second embodiment. In FIG. 9, the camera 10 and the sensor 20 are illustrated as well, in order to make clear the connection relationships.

As shown in FIG. 9, the computer 30 is provided with a lane change detection unit (lane change detection means) 37. The lane change detection unit 37 is designed to detect lane changes by the vehicle V. In specific terms, the lane change detection unit 37 detects a lane change by the vehicle V by detecting a turn signal operation by the driver. The method for detecting lane changes is not limited to this; lane changes may instead be detected, for example, by deciding, based on image data captured by the camera 10, that the vehicle V is moving laterally; or lane changes may be detected from a combination of the signal from the steering angle sensor 22 and the signal from a lateral G force sensor.

Figure 10:
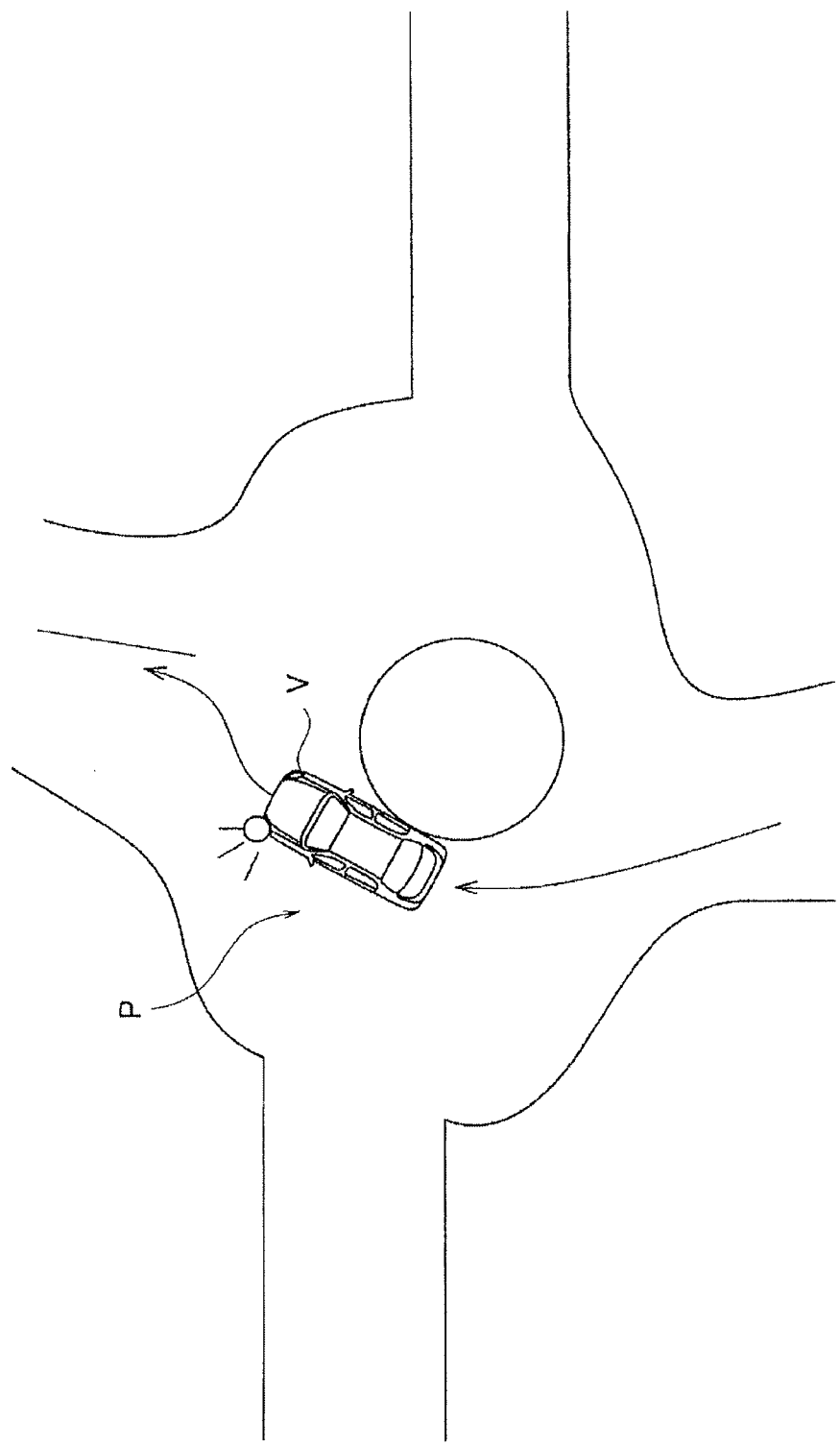
FIG. 10 is a top view of a vehicle, showing an overview of operation of the moving-body-detecting device according to the third embodiment, and showing a vehicle as it travels through a roundabout.

FIG. 10 is a top view of a vehicle, showing an overview of operation of the moving-body-detecting device 3 according to the third embodiment, and showing the vehicle V as it travels through a roundabout. As shown in FIG. 10, as the vehicle V enters the roundabout, the driver steers the steering wheel somewhat in the rightward direction due to the clockwise traffic flow through the roundabout. Thereafter, the vehicle V reaches position P shown in FIG. 10. At this time, while starting to exit the roundabout, the driver turns on the left turn signal, as well steering the steering wheel in the leftward direction. The vehicle V then exits the roundabout.

Figure 11:
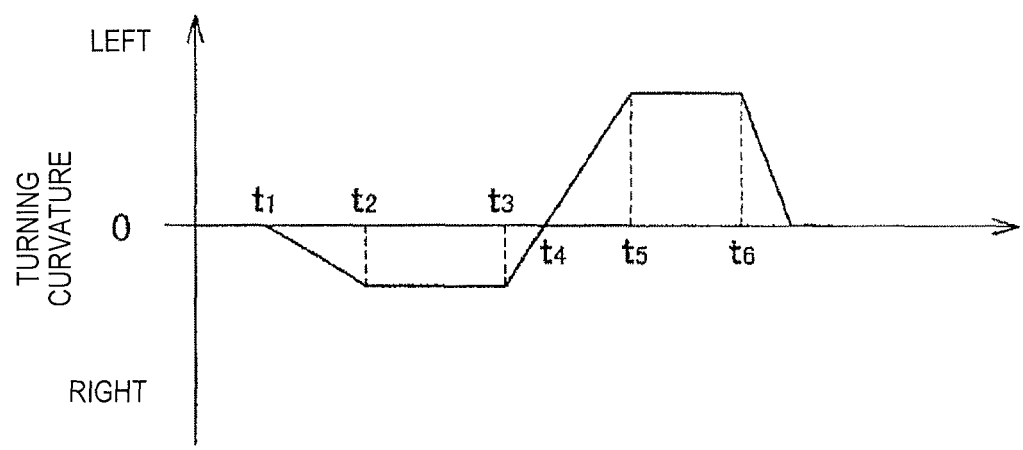
FIG. 11 is a graph showing turning curvature during travel through the roundabout shown in FIG. 10.

FIG. 11 is a graph showing turning curvature during travel through the roundabout shown in FIG. 10. As was described with reference to FIG. 10, firstly, when entering the roundabout, the driver of the vehicle V steers the steering wheel to the rightward direction, and therefore from time t1 to t2, the turning curvature towards the rightward direction increases. Then, from time t2, the turning curvature maintains a constant value. Next, at time t3, in order to exit the roundabout, the driver turns on the left turn signal, and steers the steering wheel to the left side. In so doing, starting at time t4, the turning curvature initially goes to zero, and subsequently the turning curvature towards the leftward direction rises until time t5. Then, as the driver exits the roundabout, the steering wheel starts to return to the original position, and therefore the turning curvature decreases starting at time t6.

Figure 12:
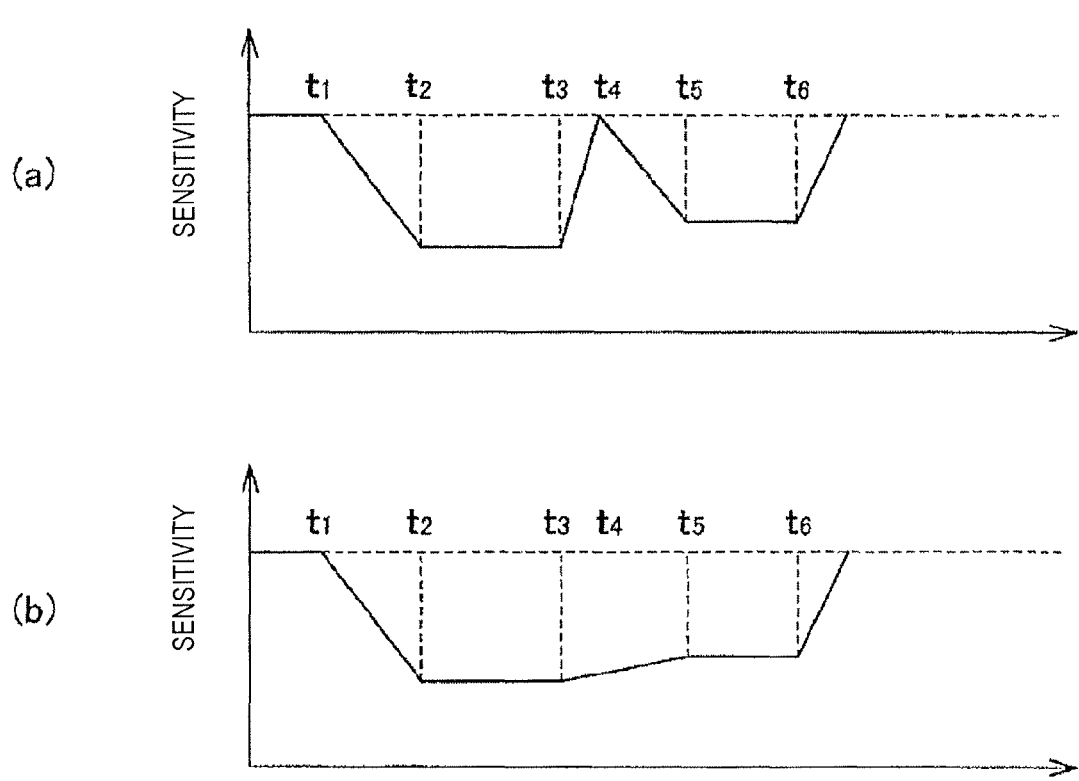
FIG. 12 is a graph showing sensitivity while traveling through the roundabout shown in FIG. 10, wherein part (a) shows a comparative example, and part (b) shows the state of sensitivity of the moving-body-detecting device according to the third embodiment.

FIG. 12 is a graph showing sensitivity while traveling through the roundabout shown in FIG. 10, wherein part (a) shows a comparative example, and part (b) shows the state of sensitivity of the moving-body-detecting device 3 according to the third embodiment. In part (a) of FIG. 12, sensitivity change of the moving-body-detecting device 1 according to the first embodiment is described by way of a comparative example.

In the case of travel of the vehicle V through a roundabout as described above, as shown in part (a) of FIG. 12, turning firstly occurs at time t1, and therefore sensitivity is lowered. Because the turning curvature rises until time t2, the sensitivity progressively declines from time t1 to t2 as well.

Then, from time t2 to t3, a constant turning curvature is maintained, and the sensitivity is kept at a lowered level. Thereafter, when the driver turns on the left turn signal and steers the steering wheel to the left side in order to exit the roundabout, starting at time t4, the turning curvature initially goes to zero, and therefore from time t3 to t4 the sensitivity returns to the original value. Next, the turning curvature towards the leftward direction rises until time t5, and therefore from time t4 to t5, the sensitivity is again lowered. Then, from time t5 to t6, constant turning curvature is maintained, and the sensitivity is kept at a lowered level as well. With the subsequent decline of the turning curvature, the sensitivity rises towards its initial value.

However, as will be understood from part (a) of FIG. 12, the sensitivity at time t4 is the same as during normal times. Therefore, at the instant of going to zero, or thereabouts, it becomes easy for a stationary object to be detected in error as a moving body. In a roundabout in particular, it is common for grass or the like to be situated at the center, and when the sensitivity assumes the same value as during normal times, even temporarily, there is a risk of reduced detection accuracy of moving bodies.

Thus, in cases in which the steering angle has reached or fallen below a specified value, the sensitivity setting unit 36 according to the third embodiment, in response to the lane change detection unit 37 having detected a lane change in the opposite direction from the turning direction during current driving, reduces the reversion speed at which lowered sensitivity reverts the level of sensitivity prior to reduction.

Specifically, as shown in part (b) of FIG. 12 from time t3 to t4, the sensitivity does not return to the initial value, but instead is slowly lowered from time t3 to t5. In so doing, a sharp drop in sensitivity is prevented, so that a situation in which detection accuracy of moving bodies is reduced can be prevented.

Figure 13:
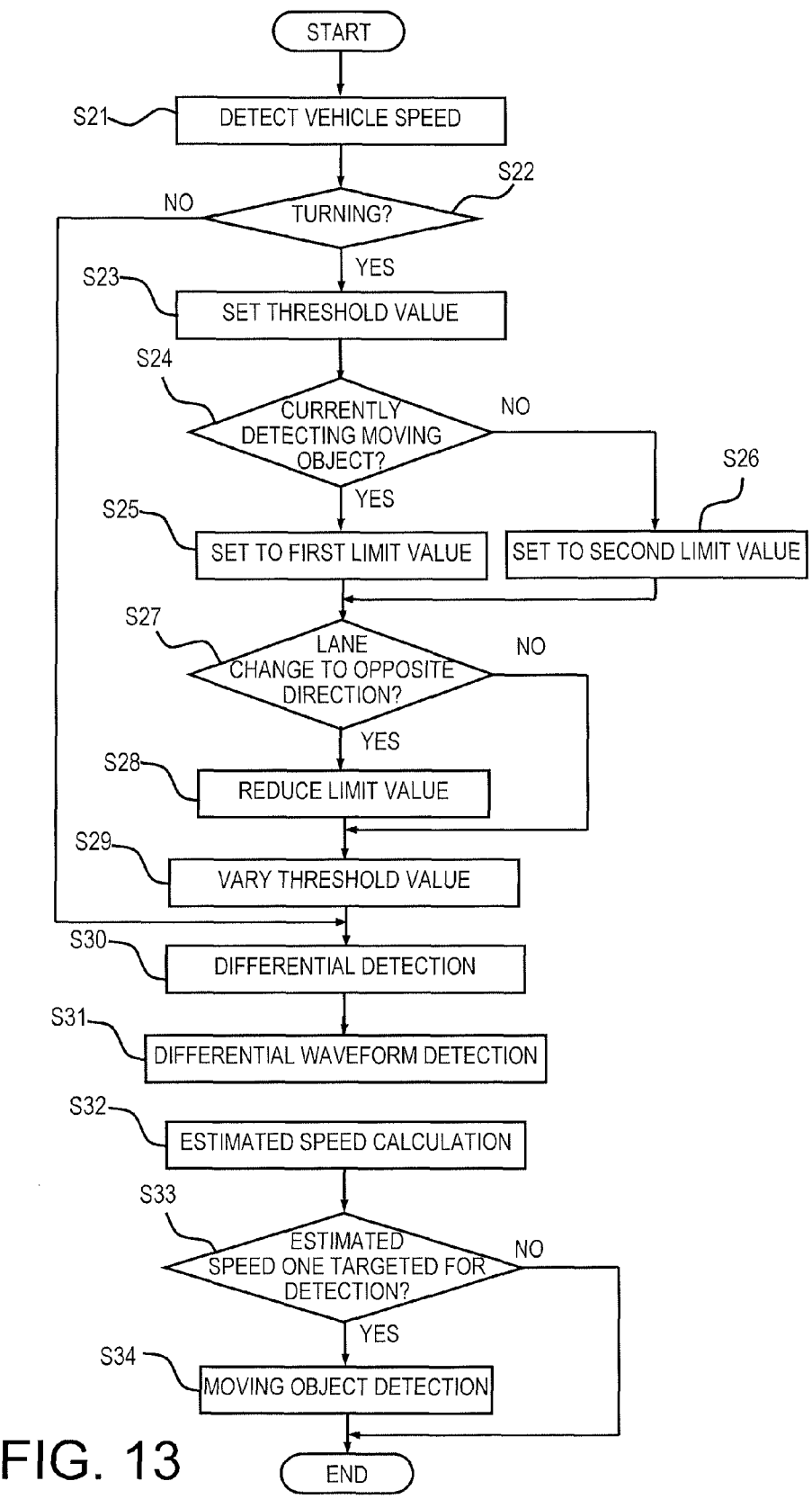
FIG. 13 is a flowchart showing the moving-body-detecting method according to the third embodiment.

Next, the moving-body-detecting method according to the third embodiment shall be described. FIG. 13 is a flowchart showing the moving-body-detecting method according to the third embodiment. The process from Steps S21 to S26 shown in FIG. 13 is similar to the process from Steps S1 to S6 shown in FIG. 7, and therefore a description is omitted.

In Step S27, in cases in which the steering angle has reached or fallen below a specified value, the sensitivity setting unit 36 decides whether or not a lane change in the opposite direction from the turning direction thereof has been detected (S27). In the case of a decision that a lane change in the opposite direction from the turning direction has been detected (S27: YES), it is conceivable that the vehicle V is traveling through a roundabout in the manner described with reference to FIGS. 10 to 12. Therefore, the sensitivity setting unit 36 reduces the limit value that was set in Step 25 or 26. In so doing, as shown in part (b) of FIG. 12, the reversion speed at which the lowered sensitivity is prompted to revert is reduced, with no sharp change of sensitivity.

The process then advances to Step S29. The process from Steps S29 to S34 shown in FIG. 13 is similar to the process from Steps S7 to S12 shown in FIG. 7, and therefore a description is omitted.

In the above manner, with the moving-body-detecting device 3 and the moving-body-detecting method according to the third embodiment, likewise with respect to the first embodiment, the detection accuracy of moving bodies can be improved; and even if differential waveforms appear large despite being associated with stationary objects, due to the raised threshold value TH, such objects are unlikely to be decided to be moving objects. Moreover, the detection accuracy of moving bodies can be further improved, and mistaken assessment of stationary objects as moving objects can be further avoided.

Additionally, according to the third embodiment, in cases in which the steering angle has reached or fallen below a specified value, when a lane change in the opposite direction from the turning direction has been detected, the reversion speed at which the lowered sensitivity reverts to its level of sensitivity prior to being lowered is reduced. Therefore, in cases in which, for example, the turn signal of the opposite direction from the turning direction is turned on in the course of exiting a roundabout or the like, when the state of turning temporarily goes to zero but turning occurs thereafter, the lowered sensitivity does not immediately revert, so that at the instant of going to zero, or thereabouts, stationary objects are not decided to be moving objects. Consequently, the detection accuracy of moving bodies can be improved, even in cases of exiting a roundabout or the like.

Next, a fourth embodiment of the present invention will be described. The moving-body-detecting device and moving-body-detecting method according to the fourth embodiment are similar to those of the first embodiment, but with some differences in configuration and in process content. The differences with respect to the first embodiment are described below.

Figure 14:
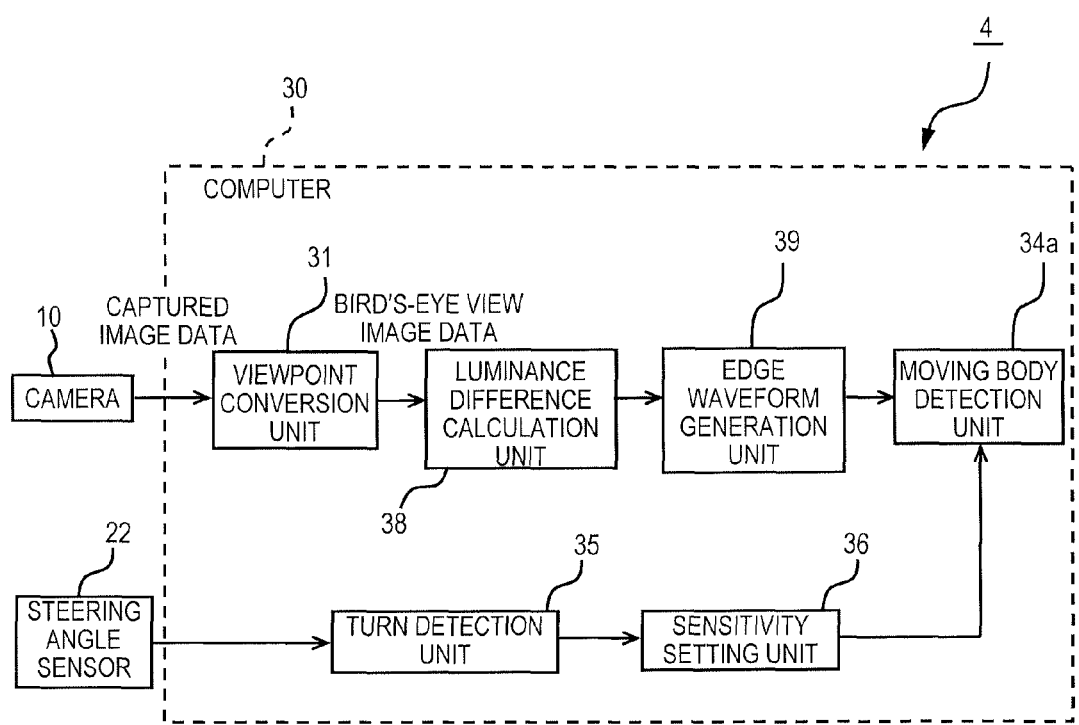
FIG. 14 is a block diagram showing details of the computer according to a fourth embodiment.

FIG. 14 is a block diagram showing details of the computer 30 according to the fourth embodiment. In FIG. 14, the camera 10 is illustrated as well, in order to make clear the connection relationships.

As shown in FIG. 14, in the fourth embodiment, the computer 30 is provided with a luminance difference calculation unit 38, an edge waveform generation unit 39, and a moving body detection unit 34a. The configuration of each of these is described below.

The luminance difference calculation unit 38 is designed to detect edges of a three-dimensional object included in a bird's-eye image, by computing luminance differences between pixel areas in bird's-eye image data that has undergone viewpoint conversion by the viewpoint conversion unit 31. In specific terms, the luminance difference calculation unit 38 establishes a plurality of calculation points along a hypothetical vertical line extending in the vertical direction through real space, and calculates the luminance difference between two pixels close to the calculation points in question. The luminance difference calculation unit 38 can calculate luminance differences by either a technique of establishing a single hypothetical vertical line extending in the vertical direction through real space, or a technique of establishing two hypothetical vertical lines.

A specific technique of establishing two hypothetical vertical lines shall be described here. Within a viewpoint-converted bird's-eye image, the luminance difference calculation unit 38 establishes a first hypothetical vertical line corresponding to a segment extending in the vertical direction through real space, and a second hypothetical vertical line, different from the first hypothetical vertical line and corresponding to a segment extending in the vertical direction through real space. The luminance difference calculation unit 38 then derives luminance differences between points on the first hypothetical vertical line and points on the second hypothetical vertical line, doing so continuously along the first hypothetical vertical line and the second hypothetical vertical line. The operation of the luminance difference calculation unit 38 shall be described in detail below.

As shown in part (a) of FIG. 15, the luminance difference calculation unit 38 establishes a first hypothetical vertical line La (hereinafter termed "line of interest La") corresponding to a segment extending in the vertical direction through real space, and passing through detection area A1. The luminance difference calculation unit 38 also establishes a second hypothetical vertical line Lr (hereinafter termed "reference line Lr") different from the line of interest La, corresponding to a segment extending in the vertical direction through real space, and passing through detection area A1. This reference line Lr is established at a position a predetermined distance away from the line of interest La in real space. The lines corresponding to segments extending in the vertical direction through real space are lines that spread radially from the position Ps of the camera 10 in the bird's-eye image. These radially spreading lines are lines that lie along the direction of foreshortening of three-dimensional objects during conversion to bird's-eye view.

The luminance difference calculation unit 38 establishes a point of interest Pa on the line of interest La (a point on the first hypothetical vertical line). The luminance difference calculation unit 38 also establishes a reference point Pr on the reference line Lr (a point on the second hypothetical vertical line). The relationships among the line of interest La, the point of interest Pa, the reference line Lr, and the reference point Pr in real space are shown in part (b) of FIG. 15. As will by understood from part (b) of FIG. 15, the line of interest La and the reference line Lr are lines extending in the vertical direction through real space, while the point of interest Pa and the reference point Pr are points set at approximately the same height in real space. It is not essential for the point of interest Pa and the reference point Pr to be exactly at the same height, and a certain amount of error, such that the point of interest Pa and the reference point Pr may be considered to be at the same height, is permissible.

The luminance difference calculation unit 38 derives the luminance difference between the point of interest Pa and the reference point Pr. In the event of a large luminance difference between the point of interest Pa and the reference point Pr, it is conceivable that an edge is present between the point of interest Pa and the reference point Pr. In particular, in the fourth embodiment, hypothetical vertical lines are established as segments extending in the vertical direction through real space in the bird's-eye image, for the purpose of detecting three-dimensional objects present in the detection areas A1, A2, and therefore in cases of a high large luminance difference between the line of interest La and the reference line Lr, there is a high likelihood that an edge of a three-dimensional object is present at the location where the line of interest La has been set.

Figure 16:
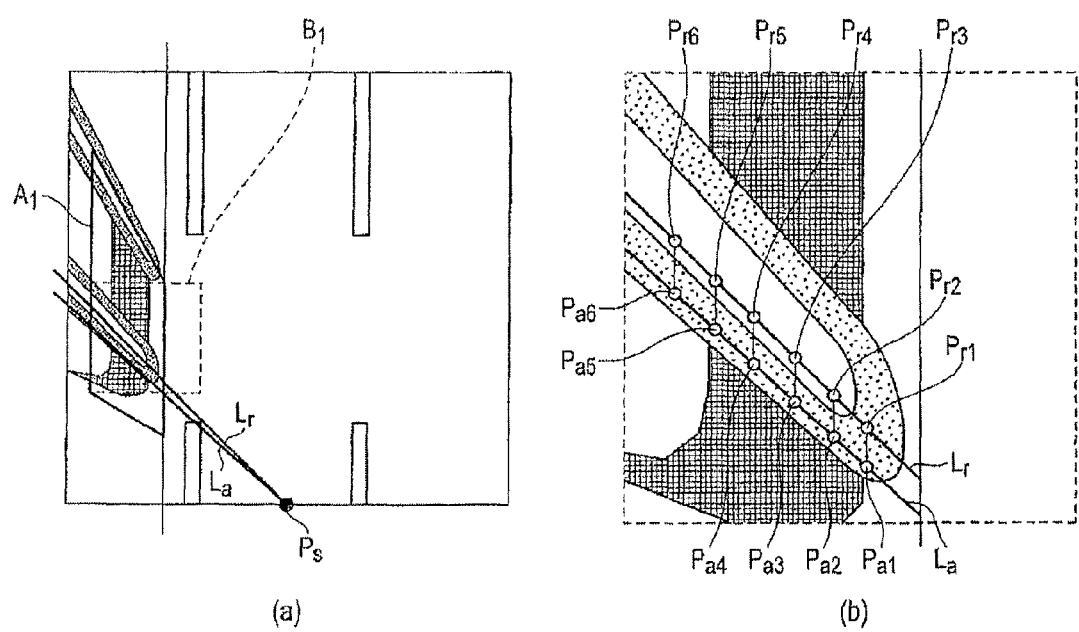
FIG. 16 is a diagram describing detailed operation of the luminance difference calculation unit according to the fourth embodiment, wherein part (a) is a diagram showing a detection area in a bird's-eye view image, and part (b) is a diagram showing positional relationships of a line of interest, a reference line, a point of interest, and a reference point in a bird's-eye view image.

This point shall be described in greater detail. FIG. 16 is a diagram describing detailed operation of the luminance difference calculation unit 38, wherein part (a) shows a bird's-eye image taken in bird's-eye view, and part (b) is an enlarged view of a portion B1 of the bird's-eye image shown in part (a) of FIG. 16. Whereas FIG. 16 shows and describes only detection area A1, a comparable procedure would be used to calculate luminance differences for detection area A2 as well.

In a case in which another vehicle V shows up within a captured image captured by the camera 10, the other vehicle V appears in the detection area A1 within the bird's-eye image, as shown in part (a) of FIG. 16. Let it be assumed that, as shown by the enlarged view of area B1 of part (b) of FIG. 16, the line of interest La has been established on a rubber section of a tire of the other vehicle V in the bird's-eye image. In this state, the luminance difference calculation unit 38 first establishes the reference line Lr. The reference line Lr is established along the vertical direction, at a position a predetermined distance away from the line of interest La in real space. In specific terms, in the moving-body-detecting device 4 of the present embodiment, the reference line Lr is established at a position 10 cm away from the line of interest La in real space. In so doing, the reference line Lr is established, for example, on the wheel of the tire of the other vehicle V, which is the equivalent of 10 cm away from the rubber of the tire of the other vehicle V, within the bird's-eye image.

Next, the luminance difference calculation unit 38 establishes a plurality of points Pa1 to PaN on the line of interest La. In part (b) of FIG. 16, for convenience, six points of interest Pa1 to Pa6 (hereinafter, simply the term "point of interest Pai" shall be used in cases in which an arbitrary point is shown) are established. The number of points of interest Pa established on the line of interest La is arbitrary. In the following description, it is assumed in the description that a number N of points of interest have been established on the line of interest La.

Next, the luminance difference calculation unit 38 establishes reference points Pr1 to PrN, in such a manner that these points are at the same height as the points of interest Pa1 to PaN in real space. The luminance difference calculation unit 38 then calculates the luminance differences between the points of interest Pa and the reference points Pr at the same height. In so doing, the luminance difference calculation unit 38 calculates the luminance difference between two pixels, for each of a plurality of positions (1 to N) along hypothetical vertical lines extending in the vertical direction through real space. For example, the luminance difference calculation unit 38 calculates the luminance difference between the first point of interest Pa1 and the first reference point Pr1, and calculates the luminance difference between the second point of interest Pa2 and the second reference point Pr2. In so doing, the luminance difference calculation unit 38 derives luminance differences in a continuous manner along the line of interest La and the reference line Lr. Specifically, the luminance difference calculation unit 38 successively derives the luminance differences between the third to N-th points of interest Pa3 to PaN and the third to N-th reference points Pr3 to PrN.

The luminance difference calculation unit 38, while shifting the line of interest La within the detection area A1, repeatedly executes the aforedescribed process of establishing the reference line Lr, establishing the points of interest Pa and the reference points Pr, and calculating luminance differences. Specifically, the luminance difference calculation unit 38 repeatedly executes the aforedescribed process while varying the positions of the line of interest La and the reference line Lr, respectively, by the same given distance in the direction of extension of a tangent line L1 in real space. For example, the luminance difference calculation unit 38 establishes the line that served as the reference line in the previous process, as the line of interest La, establishes a reference line Lr for this line of interest La, and derives the luminance differences in successive fashion.

In this way, according to the second embodiment, by deriving luminance differences from the points of interest Pa on the line of interest La and the reference points Pr on the reference line Lr at approximately the same height in real space, luminance differences can be clearly detected in cases in which an edge is present in the vertical direction. Also, because luminance differences are compared between hypothetical vertical lines extending in the vertical direction in real space, even when a three-dimensional object has been stretched according to its height from the road face due to conversion to a bird's-eye image, the three-dimensional object detection process is unaffected, and the detection accuracy of three-dimensional objects can be improved.

The edge waveform generation unit 39 shown in FIG. 14 generates a one-dimensional edge waveform $EW_t$ based on an edge detected by the luminance difference calculation unit 38. For example, the edge waveform generation unit 39 can generate the one-dimensional edge waveform $EW_t$ by detecting pixels for which the intensity (luminance difference) of the edge is equal to or greater than a predetermined edge threshold value t, and in a manner comparable to the method for generating the differential waveforms $DW_t$ in the first embodiment, count the number of pixels for which the intensity (luminance difference) of the edge is equal to or greater than a predetermined edge threshold value t, doing so along the direction of foreshortening of three-dimensional objects due to viewpoint conversion, creating a frequency distribution.

Figure 17:
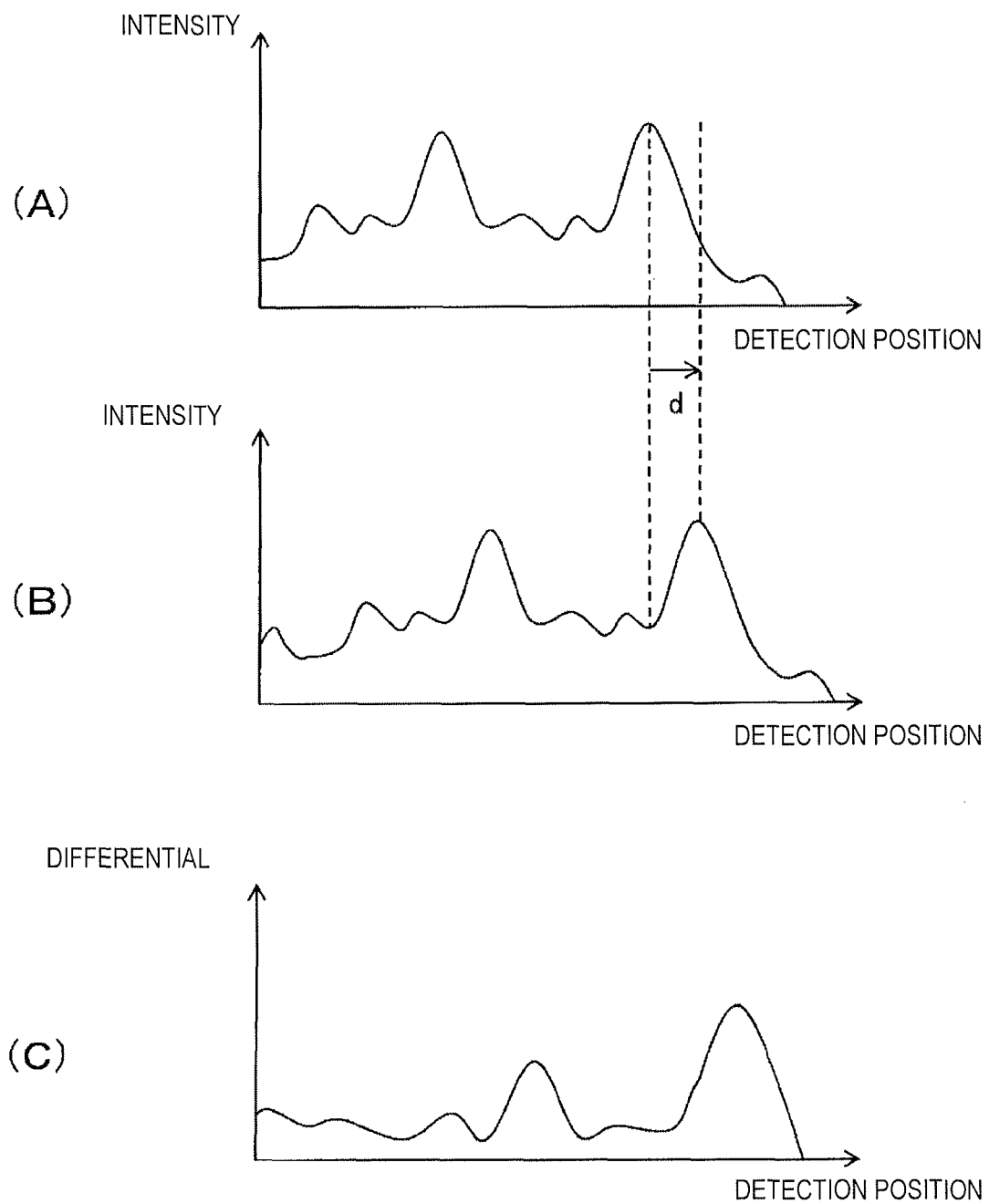
FIG. 17 is a diagram describing a method for generating an edge differential waveform by an edge waveform generation unit.

Furthermore, by offsetting the edge waveform $EW_{t-1}$ of the immediately preceding point in time by the equivalent of the amount of movement based on the vehicle speed of the vehicle V, the edge waveform generation unit 39 performs position alignment of the edge waveform $EW_{t-1}$ of the immediately preceding point in time and the current edge waveform $EW_t$, and based on the differential of the position-aligned edge waveform $EW_{t-1}$ of the immediately preceding point in time and the current edge waveform $EW_t$, generates an edge differential waveform $EW_t'$. Here, part (A) of FIG. 1 is an example of the current edge waveform $EW_t$, and part (B) of FIG. 1 is an example of the edge waveform $EW_{t-1}$ of the immediately preceding point in time. In this case, it can be decided that the three-dimensional object has moved by a distance d with respect to the vehicle V. In this case, as shown in part (C) of FIG. 17, the edge waveform generation unit 39 can generate the edge differential waveform $EW_t$ by plotting the differential between the position-aligned edge waveform $EW_{t-1}$ of the immediately preceding point in time and the current edge waveform $EW_t$ on the vertical axis, and the detection position in the direction of advance of the detection area on the horizontal axis. By having the edge waveform generation unit 39 generate the edge differential waveform $EW_t'$ based on the differential between the edge waveform $EW_{t-1}$ of the immediately preceding point in time and the current edge waveform $EW_t$ in this manner, three-dimensional objects that are highly likely to be moving bodies can be detected.

Based on the edge differential waveform $EW_t'$ data, the moving body detection unit 34a detects moving bodies. In the same manner as in the first embodiment, the moving body detection unit 34a first calculates the average value of the edge differential waveform $EW_t'$, and if the calculated average value of the edge differential waveform $EW_t'$ is equal to or greater than the threshold value TH set by the sensitivity setting unit 36, decides that it is possible that a moving body is present; or on the other hand, if the average value of the edge differential waveform $EW_t'$ is not equal to or greater than the threshold value TH, decides that there is no possibility of a moving body being present. In cases in which the edge differential waveform $EW_t'$ is due to noise, the average value of the edge differential waveform $EW_t'$ is unlikely to be equal to or greater than the threshold value TH, and therefore the moving body detection unit 34a first executes a threshold value process and decides as to the possibility of a moving body. The moving body detection unit 34a is not limited to this, and it would also be acceptable, for example, to decide that an object is possibly a moving body in cases in which the ratio of the surface area equal to or greater than a predetermined threshold value within the edge differential waveform $EW_t'$ is equal to or greater than a predetermined ratio, and to decide that there is no possibility of being a moving object, in cases in which this is not so. As the threshold value for deciding whether a three-dimensional object is a moving body based on the edge differential waveform $EW_t'$, the sensitivity setting unit 36 can set a threshold value that is different from the threshold value for deciding whether a three-dimensional object is a moving body based on the differential waveform $DW_t$.

In cases in which the moving body detection unit 34a has decided in the aforedescribed threshold value process that a three-dimensional object indicated by the edge differential waveform $EW_t'$ is possibly a moving object, it associates the edge differential waveform $EW_{t-1}'$ of the immediately preceding point in time and this edge differential waveform $EW_t'$ to calculate an estimated speed of the three-dimensional object. For example, in a case in which the three-dimensional object is another vehicle V, edges are easily obtained in tire sections of the other vehicle V, and therefore the edge differential waveform $EW_{t-1}'$ will easily tend to have two maximum values. Therefore, by deriving the deviation between the maximum values of the immediately preceding point in time edge differential waveform $EW_{t-1}'$ and this edge differential waveform $EW_t'$, the relative speed of the other vehicle V with respect to the vehicle V can be derived. In so doing, the moving body detection unit 34a derives an estimated speed of the three-dimensional object. Then, based on the estimated speed, the moving body detection unit 34a decides whether the three-dimensional object represented by the edge differential waveform $EW_t'$ is a moving object or a stationary object.

Figure 18:
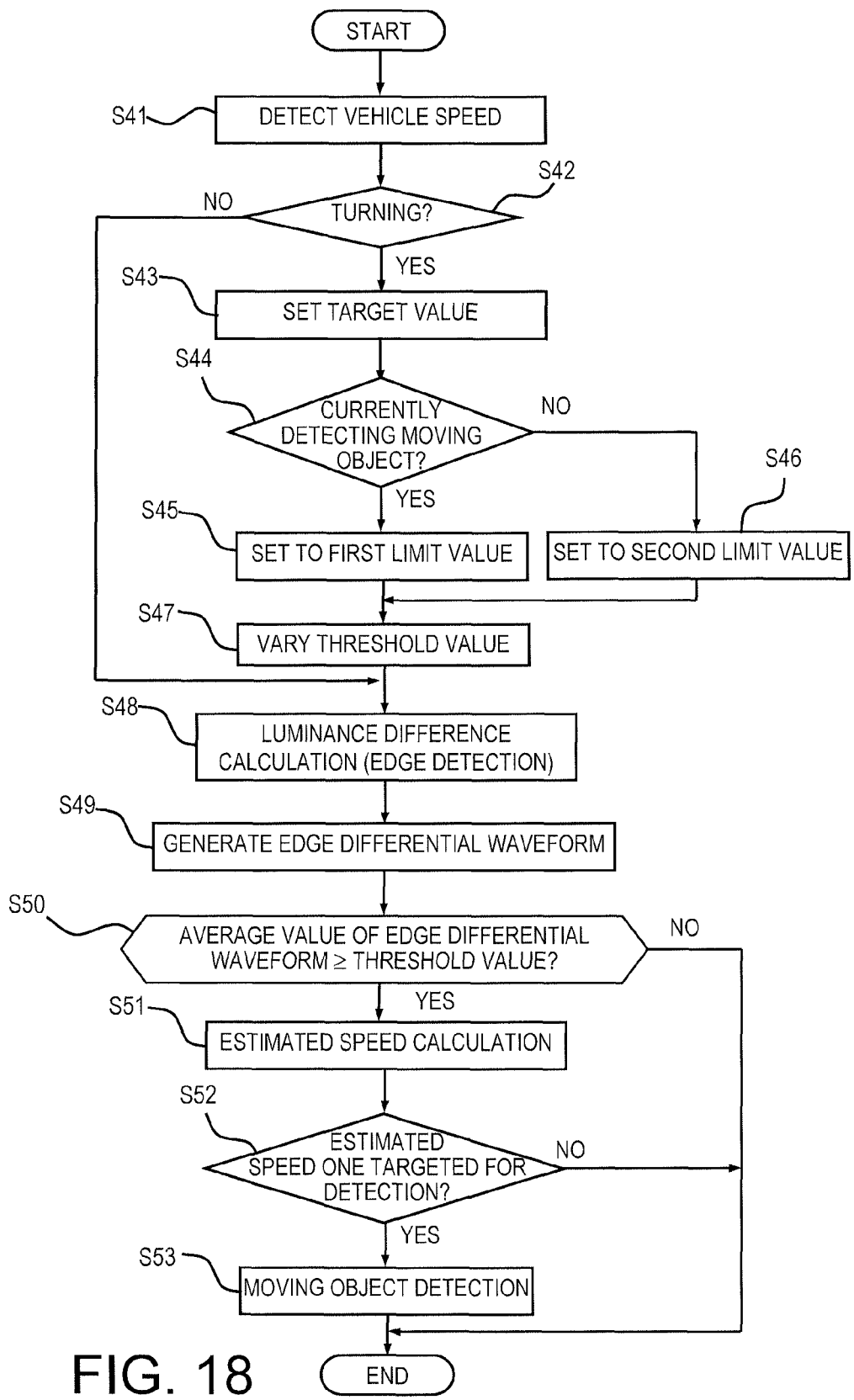
FIG. 18 is a flowchart showing the moving-body-detecting method according to the fourth embodiment.

Next, the moving-body-detecting method according to the fourth embodiment shall be described. FIG. 18 is a flowchart showing the moving-body-detecting method according to the fourth embodiment. The process from Steps S41 to S47 in FIG. 18 is similar to the process from Steps S1 to S7 shown in FIG. 7, and therefore a description is omitted.

Figure 15:
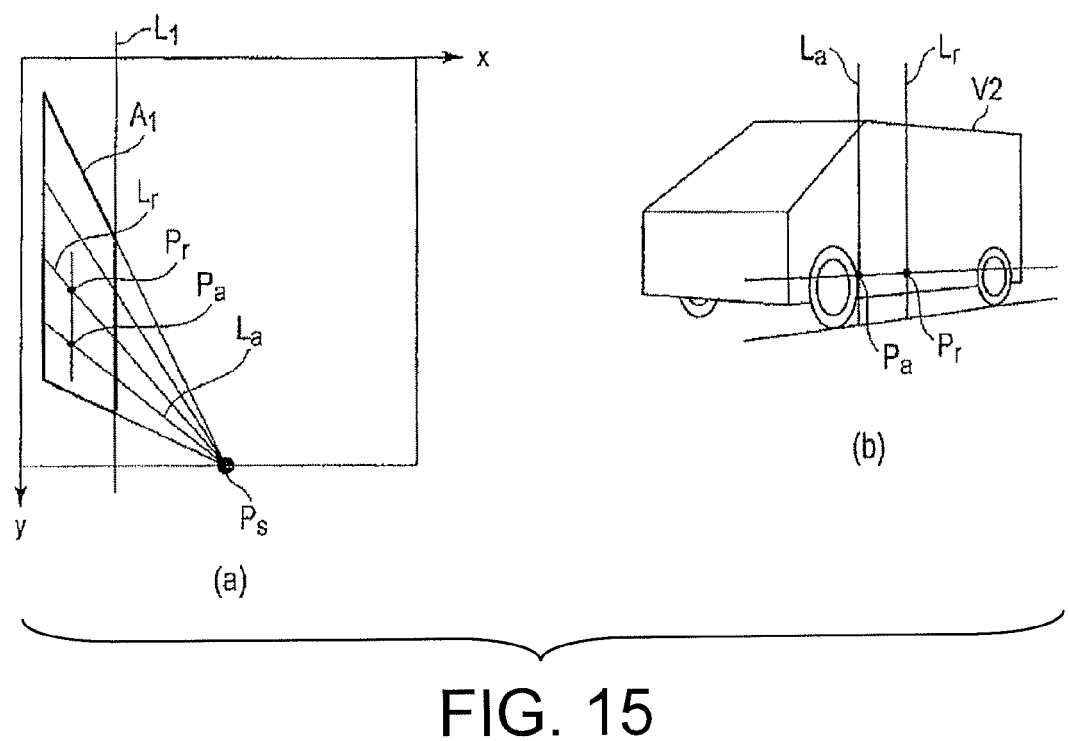
FIG. 15 is a diagram describing the operation of the luminance difference calculation unit according to the fourth embodiment, wherein part (a) is a diagram showing positional relationships of a line of interest, a reference line, a point of interest, and a reference point in a bird's-eye view image, and part (b) is a diagram showing positional relationships of a line of interest, a reference line, a point of interest, and a reference point in real space.

As shown in FIG. 15, in Step S48, the luminance difference calculation unit 38 establishes as a line of interest La a line corresponding to a line extending in the vertical direction through real space, and establishes as a reference line Lr a line a predetermined distance away from the line of interest La in real space. The luminance difference calculation unit 38 then establishes a plurality of points of interest Pa on the line of interest La, and a plurality of reference points Pr on the reference line Lr, doing so at approximately the same height as the points of interest Pa. The luminance difference calculation unit 38 then calculates the luminance differences between points of interest Pa and reference points Pr at the same height in real space, to detect an edge of a photographic subject, from a bird's-eye image.

In Step S49, based on the edge detected in Step S48, a one-dimensional edge differential waveform $ED_t'$ is generated by the edge waveform generation unit 39. In specific terms, the edge waveform generation unit 39 counts the number of pixels in which an edge was detected, doing so in the direction of foreshortening due to viewpoint conversion, and creates a frequency distribution, to generate the one-dimensional edge waveform $ED_t'$. The edge waveform generation unit 39 further performs position alignment of the edge waveform $EW_{t-1}$ of the immediately preceding point in time and the current edge waveform $EW_t$, and generates the one-dimensional edge differential waveform $EW_t'$ based on the differential of the position-aligned edge waveform $EW_{t-1}$ of the immediately preceding point in time and the current edge waveform $EW_t$.

Then, in Step S50, a decision as to whether the average value of the edge differential waveform $EW_t'$ generated in Step S49 is equal to or greater than the threshold value TH that was set in Step S47 is made by the moving body detection unit 34a. In cases in which the average value of the edge differential waveform $EW_t'$ is equal to or greater than the threshold value TH, it is decided that there is possibly a moving body present, and the process advances to Step S51. On the other hand, in cases in which the average value of the edge differential waveform $EW_t'$ is less than the threshold value TH, it is decided that there is no possibility that a moving body is present, and the process shown in FIG. 17 terminates.

In Step S51, the moving body detection unit 34a performs a calculation of estimated speed of a three-dimensional object, doing so based on the differential of the position-aligned edge waveform $EW_{t-1}'$ of the immediately preceding point in time and the edge waveform $EW_t'$ generated by this current process. Then, in Steps S52, S53, a decision is made in the same manner as in Steps S11, S12 of the first embodiment, as to whether the estimated speed of the three-dimensional object is an appropriate speed for another vehicle or motorcycle (S52). In cases in which the estimated speed of the three-dimensional object is an appropriate speed for another vehicle or motorcycle (S52: YES), it is decided that the three-dimensional object indicated by the edge waveform $EW_t'$ is a moving body of the class targeted for detection (other vehicles, motorcycles, and the like) (S53).

In this way, with the moving-body-detecting device 4 and the moving-body-detecting method according to the fourth embodiment, an edge is detected from a bird's-eye image, and an estimated speed of the three-dimensional object is calculated based on the detected edge, whereby, even in situations in which, depending on the light environment of the vehicle V, it is difficult to calculate an estimated speed of a three-dimensional object based on a differential waveform, an estimated speed of a three-dimensional object can be calculated based on an edge. Moreover, according to the fourth embodiment, even in cases in which, despite indicating a stationary object, the edge differential waveform $EW_t'$ appears large due to turning of the vehicle V, by modifying the threshold value TH in a manner dependent on the state of turning the vehicle V, mis-detection of stationary objects as moving objects can be effectively prevented.

While the present invention has been described above based on embodiments, the present invention is in no way limited to the aforedescribed embodiments, and various modifications are possible without departing from the spirit of the present invention, as are combinations of the embodiments.

For example, in the aforedescribed embodiments, the vehicle speed of the vehicle V is decided based on a signal from the speed sensor 21, but there is no limitation thereto, and it would be acceptable to estimate speed from a plurality of images taken at different times. In this case, the need for a speed sensor would be obviated, and a simpler configuration achieved.

Additionally, in the aforedescribed embodiments, the captured image at the current point in time and the image at the immediately preceding point in time are converted into bird's-eye diagrams, and after performing position alignment of the converted bird's-eye diagrams, a differential image $PD_t$ is generated, and the generated differential image $PD_t$ is evaluated along the foreshortening direction (the direction of foreshortening of three-dimensional objects during conversion of the captured images to bird's-eye diagrams), generating a differential waveform $DW_t$, but there is no limitation thereto. For example, conversion to a bird's-eye diagram could be performed exclusively on the image of the immediately preceding point in time, and after position alignment of the converted bird's-eye diagram, again converted to the equivalent of a captured image, followed by generation of a differential image from this image and the image at the current point in time, and evaluation of the generated differential image along a direction corresponding to the foreshortening direction (specifically, the direction of conversion of the foreshortening direction to a direction on the capture image), to generate a differential waveform $DW_t$. Specifically, provided that position alignment of the image at the current point in time and the image of the immediately preceding point in time is performed, a differential image $PD_t$ is generated from the differential both of the position-aligned images, and the differential image $PD_t$ is evaluated along the direction of foreshortening of three-dimensional objects during conversion to a bird's-eye diagram, it is not always necessary to generate a bird's-eye diagram.

In the embodiments presented above, there were shown examples of configurations in which a three-dimensional object is decided to be a moving body in cases in which the estimated speed of the three-dimensional object has been decided to be an appropriate speed for another vehicle, a motorcycle, or the like; however, a configuration in which the speed conditions used to decide whether an object is another vehicle, a motorcycle, or the like are changed in cases in which the vehicle V is turning would be acceptable as well. For example, in cases in which a three-dimensional object is decided to be a moving object in cases in which the absolute movement speed of the three-dimensional object is 10 km/h or above, in cases in which the vehicle V is turning, it could then be decided, for example, that a three-dimensional object is a moving object in cases in which the absolute movement speed of the three-dimensional object is 20 km/h or above. In so doing, detection of three-dimensional objects as being moving bodies can be suppressed in cases in which the vehicle V is turning, so that mis-detection of stationary objects as moving bodies can be effectively prevented.

Further, in the second embodiment mentioned above, there was shown an example of a configuration in which the threshold value for extraction of differential pixels DP is changed to a higher value in cases in which the vehicle V is turning, but there is no limitation to this configuration. For example, a configuration in which the pixel values output from the pixels are lowered in cases in which the vehicle V is turning, thereby suppressing detection of three-dimensional objects as being moving bodies, would also be acceptable. In this case as well, mis-detection of a stationary object as a moving body due to turning of the vehicle V can be effectively prevented.

Furthermore, in the fourth embodiment mentioned above, there was shown an example of a configuration in which the value of the threshold value TH for deciding whether or not a three-dimensional object is a moving body is changed according to the conditions of turning of the vehicle V, but there is no limitation to this configuration. For example, a configuration in which the edge threshold t for detecting edges is changed according to the conditions of turning of the vehicle V would also be acceptable. For example, a configuration in which the edge threshold value t for detecting an edge is changed according to the conditions of turning of the vehicle V would also be acceptable. For example, in the fourth embodiment, the number of pixels for which the intensity (luminance difference) of an edge is equal to or greater than a predetermined threshold value t is counted along the direction of foreshortening of three-dimensional objects due to viewpoint conversion, creating a frequency distribution, to generate a one-dimensional edge waveform $ED_t$, and by changing this edge threshold value to a higher value in cases in which the vehicle V is turning, the values of the one-dimensional edge waveform $ED_t$ generated thereby are made smaller, and as a result, detection of moving bodies can be suppressed, so that mis-detection of stationary objects as moving bodies can be effectively prevented. A configuration in which the luminance values output from pixels are made smaller in cases in which the vehicle V is turning, to suppress detection of three-dimensional objects as moving bodies would also be acceptable. In this case as well, mis-detection of stationary objects as moving bodies due to turning of the vehicle V can be effectively prevented.

Additionally, in the fourth embodiment mentioned above, there was shown an example of a configuration in which position alignment is performed on the edge waveform $EW_{t-1}$ of the immediately preceding point in time and the current edge waveform $EW_t$; based on the differential of the position-aligned edge waveform $EW_{t-1}$ of the immediately preceding point in time and the current edge waveform $EW_t$, an edge differential waveform $EW_t'$ is generated; and the edge waveform $EW_{t-1}'$ of the immediately preceding point in time and this edge waveform $EW_t'$ are associated to calculate an estimated speed of a three-dimensional object. However, there is no limitation to this configuration, and a configuration in which, for example, an estimated speed of a three-dimensional object is calculated by associating the edge waveform $EW_{t-1}$ of the immediately preceding point in time and the current edge waveform $EW_t$ would also be acceptable. Also acceptable is a configuration in which it is decided whether the edge waveform $EW_t$ is equal to or greater than a predetermined threshold value TH, and in cases in which edge waveform $EW_t$ is equal to or greater than the predetermined threshold value TH, deciding that a three-dimensional object that is possibly a moving object is present, or in cases in which edge waveform $EW_t$ is less than the predetermined threshold value TH, deciding that no three-dimensional object that is possibly a moving object is present.

The camera 10 of the embodiments presented above corresponds to the image-capturing means of the present invention; the viewpoint conversion unit 31 corresponds to the image conversion means of the present invention; the differential image generation unit 32, the differential waveform generation unit 33, the moving body detection unit 34, 34a, the luminance difference calculation unit 38, and the edge waveform generation unit 39 correspond to the three-dimensional-object-detecting means of the present invention; the moving body detection unit 34, 34a corresponds to the moving-body-detecting means of the present invention; the turn detection unit 35 corresponds to the turn-detecting means of the present invention; the sensitivity setting unit 36 corresponds to the sensitivity setting means of the present invention; and the lane change detection unit 37 corresponds to the lane change detection means of the present invention.

The invention claimed is:

1. A moving-body-detecting device for detecting a moving body in the surroundings of a vehicle, the moving-body-detecting device comprising:

an image-capturing unit installed on-board a vehicle and that captures an image of a rear side of the vehicle;

an image conversion unit programmed to perform viewpoint conversion of captured images obtained by the image-capturing unit into bird's-eye view images;

a differential-waveform generating unit programmed to perform position alignment, in bird's-eye view, of positions of bird's-eye view images obtained at different times by the image-capturing unit, the differential-waveform generating unit being further programmed to perform count number of pixels exhibiting a predetermined differential in a differential image from a position alignment of the bird's-eye view images to create a frequency distribution and generate differential waveform information;

a three-dimensional-object-detecting unit configured to determine, based on the differential waveform information, a probability that a three-dimensional object is a moving body that is present within a predetermined area, and the three-dimensional-object-detecting unit configured to calculate a movement speed of the three-dimensional object from temporal change of a waveform of the differential waveform information;

a moving-body-detecting unit configured to determine whether or not the three-dimensional object detected by the three-dimensional-object-detecting unit is a moving body based on the movement speed of the three-dimensional object;

a turn-detecting unit configured to detect turning of the vehicle; and a control unit programmed to suppress detection of the three-dimensional object as the moving object detected by the moving-body-detecting unit, in cases in which turning of the vehicle has been detected by the turn-detecting unit as compared with cases in which the vehicle is determined not to be turning.

2. The moving-body-detecting device according to claim 1, wherein the differential-waveform generating unit generates the differential waveform information by counting the number of pixels in the differential image that exhibit a differential equal to or greater than a predetermined second threshold value and creates the frequency distribution; and the control unit changes the second threshold value to a higher value in cases in which turning of the vehicle has been detected by the turn-detecting unit, thereby suppressing detection of the three-dimensional object as compared with cases in which the vehicle is determined not to be turning.

3. The moving-body-detecting device according to claim 1, wherein the control unit outputs lower values of the frequency distribution obtained by counting of the differential pixels by the three-dimensional-object-detecting unit, thereby suppressing detection of the three-dimensional object in cases in which turning of the vehicle has been detected by the turn-detecting unit as compared with cases in which the vehicle is determined not to be turning.

4. The moving-body-detecting device according to claim 2, wherein further comprising the control unit sets the second threshold value corresponding to the rear side of the vehicle to a higher value than the second threshold value corresponding to the front side of the vehicle.

5. The moving-body-detecting device according to claim 1, wherein the turn-detecting unit detects turning of the vehicle by detecting a steering angle; and the control unit increases a degree of suppression during suppression of detection of the three-dimensional object as values for the steering angle detected by the turn-detecting unit becomes greater.

6. The moving-body-detecting device according to claim 5, further comprising:

a lane change detection unit configured to detect lane changing being performed by the vehicle; and the control unit being programmed to reduce a speed of cancellation of suppression of detection of the three-dimensional object in cases in which the steering angle is equal to or less than a specified value, and in cases in which a lane change to the opposite direction from a direction of turning thereof has been detected by the lane change detection unit.

7. The moving-body-detecting device according to claim 1, further comprising a moving-body-detecting unit configured to, based on the edge differential waveform information, whether or not the three-dimensional object detected by the three-dimensional-object-detecting unit is a moving body; and a sensitivity setting unit programmed to set a degree of suppression during suppression of detection of the three-dimensional object to a lower setting during detection of moving bodies than that during non-detection of moving bodies.

8. A moving-body-detecting device for detecting a moving body in the surroundings of a vehicle, the moving-body-detecting device comprising:

an image-capturing unit installed on-board a vehicle and that captures an image of a rear side of the vehicle;

an image conversion unit programmed to perform viewpoint conversion of captured images obtained by the image-capturing unit into bird's-eye view images;

a differential-waveform generating unit programmed to perform position alignment, in bird's-eye view, of positions of bird's-eye view images obtained at different times by the image-capturing unit, the differential-waveform generating unit being further programmed to perform count number of pixels exhibiting a predetermined differential in a differential image from a position alignment of the bird's-eye view images to create a frequency distribution and generate differential waveform information;

a three-dimensional-object-detecting unit configured to determine a probability that a three-dimensional object is a moving body that is present within a predetermined area in a case in which a size of a waveform of the differential waveform information is equal to or greater than a first threshold value a turn-detecting unit configured to detect turning of the vehicle; and a control unit programmed to change the first threshold value to a higher value, thereby suppressing detection of the three-dimensional object in cases in which turning of the vehicle has been detected by the turn-detecting unit as compared with cases in which the vehicle is determined not to be turning.

9. The moving-body-detecting device according to claim 8, wherein the three-dimensional-object-detecting unit calculates movement speed of the three-dimensional object from temporal change of a waveform of the differential waveform information, in order to decide whether or not the three-dimensional object is a moving body.

10. The moving-body-detecting device according to claim 9, further comprising
a moving-body-detecting unit configured to detect, based on the movement speed of the three-dimensional object, whether or not the three-dimensional object detected by the three-dimensional-object-detecting unit is a moving body; and
the control unit suppresses detection of the three-dimensional object as the moving body by the moving-body-detecting unit in cases in which turning of the vehicle has been detected by the turn-detecting unit as compared with cases in which the vehicle is determined not to be turning.

11. The moving-body-detecting device according to claim 8, wherein
the control unit sets the first threshold value corresponding to the rear side of the vehicle to a higher value than the first threshold value corresponding to the front side of the vehicle.

12. A moving-body-detecting device for detecting a moving body in the surroundings of a vehicle, the moving-body-detecting device comprising:
an image-capturing unit installed on-board a vehicle and that captures an image of a rear side of the vehicle;
an image conversion unit programmed to perform viewpoint conversion of captured images obtained by the image-capturing unit into bird's-eye view images;
an edge waveform generation unit programmed to generate edge waveform information and create a frequency distribution by detecting edge information in predetermined pixel areas, from the bird's-eye view images obtained by the image conversion unit, and count a number of pixel areas in which the edge information is equal to or greater than a predetermined value while proceeding along the direction of foreshortening of three-dimensional objects during the viewpoint conversion to the bird's-eye view image;
a three-dimensional-object detection unit configured to determine, based on the edge waveform information, a probability that a three-dimensional object is a moving body that is present within a predetermined area;
a turn-detecting unit configured to detect turning of the vehicle; and
a control unit programmed to suppress detection of the three-dimensional object based on the edge waveform information, in cases in which turning of the vehicle has been detected by the turn-detecting unit as compared with cases in which the vehicle is determined not to be turning.

13. The moving-body-detecting device according to claim 12, wherein
the edge-waveform-generating unit generates edge differential waveform information based on differentials of the edge waveform information generated at different points in time; and
the three-dimensional-object-detecting unit detects the three-dimensional object based on the edge differential waveform information.

14. The moving-body-detecting device according to claim 13, wherein
the three-dimensional-object-detecting unit decides that the three-dimensional object is present within the predetermined area in cases in which a size of a waveform of the edge differential waveform information is equal to or greater than a predetermined first threshold value; and
the control unit changes the first threshold value to a higher value to suppress detection of the three-dimensional object in cases in which turning of the vehicle has been detected by the turn-detecting unit as compared with cases in which the vehicle is determined not to be turning.

15. The moving-body-detecting device according to claim 13, wherein
the control unit outputs lower differentials of the edge waveforms to the edge-waveform-generating unit to suppress detection of the three-dimensional object in cases in which turning of the vehicle has been detected by the turn-detecting unit as compared with cases in which the vehicle is determined not to be turning.

16. The moving-body-detecting device according to claim 12, wherein
the edge-waveform-generating unit extracts, from the bird's-eye view images, edge components for which a luminance difference between neighboring pixel areas is equal to or greater than a predetermined second threshold value, and based on the edge components, detects the edge information; and
the control unit changes the second threshold value to a higher value to suppress detection of the three-dimensional object in cases in which turning of the vehicle has been detected by the turn-detecting unit as compared with cases in which the vehicle is determined not to be turning.

17. The moving-body-detecting device according to claim 16, further comprising
a moving-body-detecting unit configured to, based on the edge differential waveform information, whether or not the three-dimensional object detected by the three-dimensional-object-detecting unit is a moving body; and
the control unit suppresses detection of the three-dimensional object as the moving body by the moving-body-detecting unit in cases in which turning of the vehicle has been detected by the turn detecting unit as compared with cases in which the vehicle is determined not to be turning.

18. A moving-body-detecting method for detecting a moving body in the surroundings of a vehicle, the moving-body-detecting method comprising:
capturing images of a rear side of the vehicle from the vehicle to obtain captured images;
performing viewpoint conversion of the captured images into bird's-eye view images;
generating differential waveform information and creating a frequency distribution by counting a number of pixels exhibiting a predetermined differential in a differential image from position alignment of the bird's-eye view images obtained at different times;
determining, based on the differential waveform information, a probability that a three-dimensional object is a moving body that is present within a predetermined area;
calculating a movement speed of the three-dimensional object from temporal change of a waveform of the differential waveform information;
detecting based on the movement speed of the three-dimensional object, whether or not the three-dimensional object detected is a moving body;
detecting an existence of a turning state of the vehicle; and suppressing detection of the three-dimensional object based on the differential waveform information upon detecting existence of the turning state of the vehicle as compared with cases in which the vehicle is not turning.

19. A moving-body-detecting method for detecting a moving body in the surroundings of a vehicle, the moving-body-detecting method comprising:

capturing images of a rear side of the vehicle from the vehicle to obtain captured images;

performing viewpoint conversion of the captured images into bird's-eye view images;

generating differential waveform information and creating a frequency distribution by counting a number of pixels exhibiting a predetermined differential in a differential image from position alignment of the bird's-eye view images obtained at different times;

determining a probability that a three-dimensional object is a moving body that is present within a predetermined area in a case in which a size of a waveform of the differential waveform information is equal to or greater than a first threshold value and the three-dimensional object is detected;

detecting an existence of a turning state of the vehicle; and suppressing detection of the three-dimensional object based on the differential waveform information in cases in which turning of the vehicle has been detected by changing the first threshold value to a higher value upon detecting existence of the turning state of the vehicle, as compared with cases in which the vehicle is not turning.

20. A moving-body-detecting method for detecting a moving body in the surroundings of a vehicle, the moving-body-detecting method comprising:

capturing images of a rear side of the vehicle from the vehicle to obtain captured images;

performing viewpoint conversion of the captured images into bird's-eye view images;

detecting edge information in each of predetermined pixel areas from the bird's-eye view images, and while proceeding along a direction of foreshortening of three-dimensional objects during viewpoint conversion to the bird's-eye view image, counting the number of pixel areas in which the edge information is equal to or greater than a predetermined value, and creating a frequency distribution to thereby generate edge waveform information;

determining, based on the edge waveform information, a probability that a three-dimensional object is a moving body that is present within a predetermined area;

detecting an existence of a turning state of the vehicle; and suppressing detection of the three-dimensional object based on the edge waveform information in cases in which turning of the vehicle has been detected upon detecting existence of the turning state of the vehicle as compared with cases in which the vehicle is not turning.

* * * * *